United States Patent
Barnum et al.

(10) Patent No.: US 11,467,463 B2
(45) Date of Patent: Oct. 11, 2022

(54) OVERCHARGE-AWARE DRIVER FOR ELECTROCHROMIC DEVICES

(71) Applicant: Halio, Inc., Hayward, CA (US)

(72) Inventors: Walter Thomas Barnum, Salt Lake City, UT (US); Hugues Duncan, Berkeley, CA (US); Douglas Frederick Brainard, Farmington, UT (US)

(73) Assignee: Halio, Inc., Hayward, CA (US)

( * ) Notice: Subject to any disclaimer, the term of this patent is extended or adjusted under 35 U.S.C. 154(b) by 424 days.

(21) Appl. No.: 16/775,083

(22) Filed: Jan. 28, 2020

(65) Prior Publication Data
US 2020/0241379 A1    Jul. 30, 2020

Related U.S. Application Data

(60) Provisional application No. 62/798,241, filed on Jan. 29, 2019.

(51) Int. Cl.
*G02F 1/163* (2006.01)
*G02F 1/15* (2019.01)
*G02F 1/1516* (2019.01)
*B60R 1/08* (2006.01)

(52) U.S. Cl.
CPC .......... *G02F 1/163* (2013.01); *G02F 1/15165* (2019.01); *B60R 1/088* (2013.01); *G02F 2001/1502* (2013.01)

(58) Field of Classification Search
CPC . G02F 1/163; G02F 2001/1502; G02F 1/0123
USPC ................................. 359/265–275
See application file for complete search history.

(56) References Cited

U.S. PATENT DOCUMENTS

| 4,322,133 A | * | 3/1982 | Uede | G09G 3/16 359/266 |
| 4,512,637 A | * | 4/1985 | Ballmer | G02F 1/163 359/275 |
| 5,365,365 A | * | 11/1994 | Ripoche | G09G 3/38 359/275 |

(Continued)

FOREIGN PATENT DOCUMENTS

| WO | 9728484 A1 | 8/1997 | |
| WO | WO-9816870 A1 | * 4/1998 | ............. G02F 1/163 |

OTHER PUBLICATIONS

PCT Application No. PCT/US2020/015729, International Search Report and Written Opinion dated May 13, 2020, 16 pages.

*Primary Examiner* — Zachary W Wilkes
(74) *Attorney, Agent, or Firm* — Lowenstein Sandler LLP

(57) ABSTRACT

A overcharge-aware electrochromic device driver for preventing overcharge of an electrochromic device is described. One driver applies a constant supply current to an electrochromic device from a power supply. The driver determines an amount of charge as a function of time and current supplied to the electrochromic device. The driver determines whether the amount of charge reaches an overcharge limit before a sense voltage reaches a first sense voltage limit. Responsive to the amount of charge reaching the overcharge limit, the driver sets the sense voltage as a second sense voltage limit that is lower than the first sense voltage limit, ceases the constant supply current, and applies one of a variable voltage or a variable current to the electrochromic device from the power supply to maintain the sense voltage at the second sense voltage limit.

20 Claims, 12 Drawing Sheets

(56) References Cited

U.S. PATENT DOCUMENTS

| | | | |
|---|---|---|---|
| 5,654,736 A * | 8/1997 | Green | G02F 1/163 345/84 |
| 5,822,107 A * | 10/1998 | Lefrou | G02F 1/163 359/275 |
| 5,973,819 A * | 10/1999 | Pletcher | G02F 1/163 351/44 |
| 6,362,806 B1 * | 3/2002 | Reichmann | G02F 1/163 345/105 |
| 6,614,577 B1 * | 9/2003 | Yu | G02F 1/163 351/44 |
| 7,133,181 B2 * | 11/2006 | Greer | G02F 1/163 359/265 |
| 7,724,415 B2 * | 5/2010 | Yamaguchi | G09G 3/19 359/254 |
| 8,018,644 B2 * | 9/2011 | Gustavsson | G02F 1/163 359/296 |
| 8,218,223 B2 * | 7/2012 | Matthews | G02F 1/163 359/275 |
| 9,563,097 B2 * | 2/2017 | Ziebarth | G01R 19/003 |
| 9,581,877 B2 * | 2/2017 | Bass | G02F 1/1503 |
| 9,885,935 B2 * | 2/2018 | Jack | G02F 1/163 |
| 9,995,949 B2 | 6/2018 | Chandrasekhar | |
| 10,372,007 B1 * | 8/2019 | Nagel | H02J 4/00 |
| 10,768,503 B1 * | 9/2020 | Nagel | G02F 1/163 |
| 10,831,079 B2 * | 11/2020 | Ziebarth | G02F 1/0123 |
| 2003/0210449 A1 * | 11/2003 | Ingalls | G02F 1/163 359/265 |
| 2004/0001056 A1 | 1/2004 | Atherton et al. | |
| 2015/0070745 A1 | 3/2015 | Pradhan | |
| 2016/0202588 A1 * | 7/2016 | Bass | G02F 1/1503 359/265 |
| 2016/0202590 A1 * | 7/2016 | Ziebarth | G09G 3/19 359/239 |
| 2018/0059498 A1 * | 3/2018 | Coffin | G02F 1/163 |
| 2021/0231981 A1 * | 7/2021 | Wang | G02F 1/163 |

\* cited by examiner

OVERCHARGE-AWARE DRIVER FOR ELECTROCHROMIC DEVICES

RELATED APPLICATIONS

This application claims the benefit of U.S. Provisional No. 62/798,241, filed Jan. 29, 2019, the entire contents of which are incorporated by reference.

BACKGROUND

An electrochromic glass unit uses electrochromic glass that can change transmissivity with the application of electric current and voltage. The change of transmissivity typically relies on a reversible oxidation of a material. Electrochromic glass units can darken at the press of a button or other triggering events and are also often used in automobile rearview mirrors to reduce reflective glare. Controllers or drivers for electrochromic devices generally apply voltage and current of one polarity to charge the device and decrease optical transmissivity and the opposite polarity to discharge the device and increase the optical transmissivity.

The transmissivity change for current systems is relatively slow and non-uniform. Gradual, non-uniform coloring or switching is a common problem associated with large area electrochromic devices. This problem, commonly referred to as the "iris effect," is typically the result of the voltage drop through the transparent conductive coatings providing electrical contact to one side or both sides of the device. For example, when a voltage is initially applied to the device, the potential is typically the greatest in the vicinity of the edge of the device (where the voltage is applied) and the least at the center of the device; as a result, there may be a significant difference between the transmissivity near the edge of the device and the transmissivity at the center of the device. Over time, however, the difference in applied voltage between the center and edge decreases and, as a result, the difference in transmissivity at the center and edge of the device decreases.

One method of improving the switching speed of a large electrochromic device is to supply more power to the electrochromic device. However, there are several challenges that the supplying of large amounts of power introduces. The electrochromic device can be damaged by large amounts of power. The non-uniformity of the transmission of the electrochromic device during switching (e.g., the iris effect) can be exacerbated. Cables and power supplies required to supply a large amount of electrical power also need to be large, which introduces added cost to the system.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

DETAILED DESCRIPTION

Figure 1:
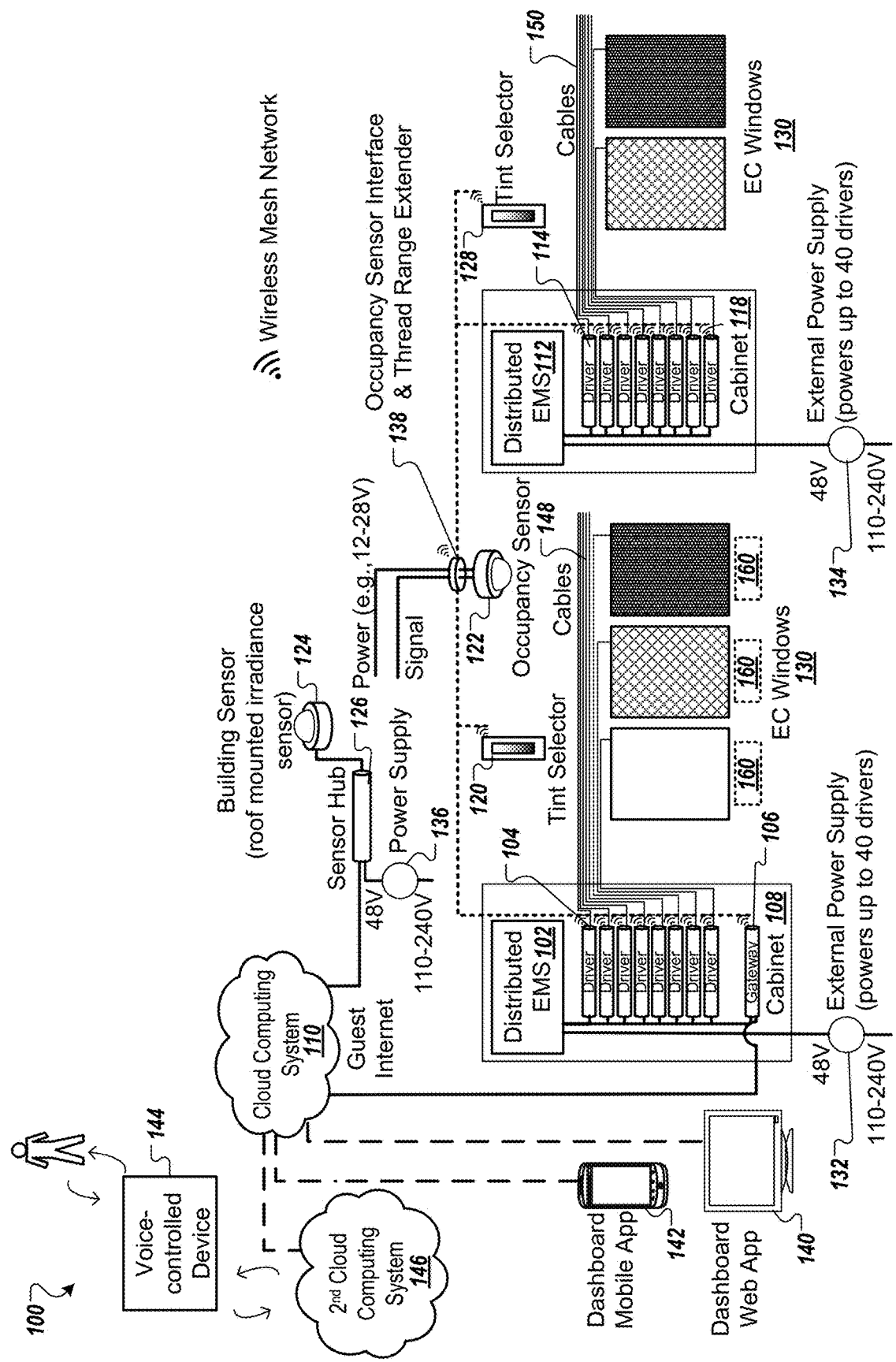
FIG. 1 is a block diagram of an electrochromic window system with an overcharge-aware electrochromic device driver to prevent overcharging an electrochromic window according to one embodiment.

An overcharge-aware electrochromic device driver for preventing overcharge of an electrochromic device is described. One driver applies a constant supply current to an electrochromic device from a power supply. The driver determines an amount of charge as a function of time and current supplied to the electrochromic device. The driver determines whether a sense voltage reaches a first sense voltage limit and whether the amount of charge reaches an overcharge limit before the sense voltage reaches the first sense voltage limit. Responsive to the amount of charge reaching the overcharge limit, the driver sets the sense voltage as a second sense voltage limit that is lower than the first sense voltage limit, ceases the constant supply current, and applies one of a variable voltage or a variable current to the electrochromic device from the power supply to maintain a sense voltage at the second sense voltage limit.

One conventional driver applies a constant supply current to an electrochromic device and, responsive to a sense voltage reaching a sense voltage limit, applies a variable voltage or a variable current to the electrochromic device to maintain the sense voltage at the sense voltage limit. The driver terminates the variable voltage or variable current being applied responsive to an amount of charge reaching a target amount of charge, where the target amount corresponds to a specified level of transmissivity of the electrochromic device. However, when the electrochromic device is operating in an environment of hot temperatures, there is a risk of over-driving the electrochromic device. The conventional driver can have a failsafe that is based on the sense voltage limit, where if a sense voltage reaches the sense voltage limit, the driver can stop driving the electrochromic device. The practical result, however, is that the electrochromic device may stop tinting too soon because the electrochromic device goes into failsafe mode prematurely due to hotter environmental conditions. For example, if a voltage of 1.5 volts is applied to the electrochromic device, 1000 coulombs of charge is delivered to the electrochromic device at room temperature. At higher temperatures, 1.5 volts applied to the electrochromic device results in a greater number of coulombs than 1000 coulombs of charge is delivered to the electrochromic device. The voltage differential between anode and cathode of the electrochromic device could be too high in some cases due to hotter temperatures, potentially damaging the electrochromic device. The higher temperatures can cause the driver to overcharge the electrochromic device. Overcharging the electrochromic device can affect the chemistry of the electrochromic device, which ultimately can affect the operation and longevity of the electrochromic device.

Aspects of the present disclosure address the above and other deficiencies by providing an overcharge protection failsafe in which a coulombs count is used, instead of the pre-defined sense voltage limit. The overcharge protection failsafe can track a current count of coulombs already in the electrochromic device and track how many coulombs go in and out of the electrochromic device. For example, the driver can determine an amount of charge transferred to the electrochromic device as a function of time and current supplied to the electrochromic device. The driver can monitor the sense voltage in view of a first sense voltage limit (e.g., a first voltage value) and can monitor the amount of charge being transferred to the electrochromic device. The driver can determine that the amount of charge reaches an overcharge limit before the sense voltage reaches the first sense voltage limit. Responsive to the amount of charge reaching the overcharge limit before the sense voltage reaches the first sense voltage limit, the driver sets the sense voltage as a second sense voltage limit (e.g., a Vsense limit dependent on higher temperatures) that is lower than the first sense voltage limit, ceases the constant supply current from the power supply, and applies one of a variable voltage or a variable current to the electrochromic device from the power supply to maintain a sense voltage at the second sense voltage limit (e.g., a second voltage value), instead of the first sense voltage limit (e.g., the second voltage value). Further, if the driver determines that the first sense voltage limit is reached before the amount of charge reaches the charge limit, the driver ceases the constant supply current and applies the variable voltage or the variable current to maintain a sense voltage at the first sense voltage limit. It should be noted that, after the drivers and the distributed energy management system (EMS) (or boost power supply) are configured via the gateway, the driver behavior is not dependent on the gateway for safe operation. That is, the gateway can be disconnected and the drivers will not drain the batteries of the distributed EMS (or boost power supply).

Accordingly, aspects of the present disclosure can provide various advantages over the conventional systems. For example, the aspects of the present disclosure can provide overcharge protection to the electrochromic device. The aspects of the present disclosure can provide a failsafe to protect overcharging the electrochromic device across various temperature environments. Aspects of the present disclosure can provide other advantages over the conventional drivers.

It should be noted that the embodiments of the drivers can be utilized in different systems, including a system with a local boost power supply, a system with distributed boost power (i.e., a system with a distributed energy management system (EMS) with a multi-device boost power supply), or the like. Some systems use a local power source (e.g., a battery) inside of a driver to supply additional power (also referred to as boost power) to an electrochromic device than can be supplied by a main power supply. The additional power can enable fast and uniform switching in a variety of conditions, and in particular when the electrochromic device includes a gradient conductive layer. An electrochromic device including a gradient transparent conductive layer can have very fast switching speed (e.g., less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The term "gradient transparent conductive layer" refers to an electrically conducting layer with spatially varying sheet resistance, or resistance to current flow substantially parallel to a major surface of the layer, that varies as a function of position within the electrically conductive layer. The gradient transparent conductive layer or layers also enable the driving of an electrochromic device incorporating such a layer at much higher voltages so that high amounts of power are required initially to drive fast switching. The size of the electrochromic device governs how much power is needed to switch the state of the electrochromic device. The power needed can be referred to as peak watt power. An electrochromic device of a first size may need a peak watt power of 28 watts and a conventional driver could supply 14 volts and 2 amps to the electrochromic device to meet the peak watt power. However, an electrochromic device of a second size (e.g., 5'×10' EC window) may need a peak watt power of 320 watts. In some cases, the driver may not supply sufficient volts and amps to meet the peak watt power. So, other systems can use the distributed EMS that has a multi-device boost power supply as described herein.

FIG. 1 is a block diagram of an electrochromic window system 100 with an overcharge-aware electrochromic device driver 104 to prevent overcharging an electrochromic window according to one embodiment. The electrochromic window system 100 includes a first cabinet 108 in which a first distributed EMS 102, a first set of drivers 104, and a gateway 106 are located. Each of the set of drivers 104 is coupled to an individual one of a set of electrochromic (EC) windows 130. Alternatively, other electrochromic devices can be driven by the set of drivers 104. The set of drivers 104 are coupled to the set of EC windows 130 via power cables 148 and control wires. The set of drivers 104 include a failsafe to prevent overcharging the electrochromic window as described in more detail below with respect to FIGS. 2A-2D.

The first cabinet 108 can be a standard size, such as 28", 42", or 60". The first cabinet 108 can be located in proximity to the EC windows 130 or located away from the EC windows 130, such as up to 300 feet. The first cabinet 108 can be located in a location that reduces wiring costs. Between each driver and EC window there may be one or more power cables 148 coupled to an anode of the EC window and one or more power cables 148 coupled to a cathode of the EC window. There may be two control wires for sensing the voltage of the EC window (referred to herein as sense voltage or Vsense) and two wires for sequestration operations, as described herein. In one embodiment, each driver of the set of drivers 104 can supply up to 8 amps to each EC window of the set of EC windows 130. An external power supply 132 is coupled to provide external power to the distributed EMS 103, the set of drivers 104, and the gateway 106 within the first cabinet 108. For example, 16

AWG 2 conductor plenum cables can provide lower voltage (48V) or higher voltage (110-240V) to the first cabinet 108. The external power supply 132 can be located in proximity to the first cabinet 108 or farther away from the first cabinet 108, such as up to hundreds of feet or up to 1000 feet. It should be noted that the external power supply 132 is configured to supply less than 25% of a maximum power used by the set of EC windows 130 during switching of one or more of the set of EC windows 130. Additional external power supplies can be used to power the components in the first cabinet 108. The external power supply 132 may be a conventional power supply connected to the power grid or it may be a building battery such as the residential batteries built by Tesla (the Powerwall battery) or LG Chem's RESU battery that obtain energy from a source such as on-site solar energy cells. The external power supply 132 may be a combination of the power grid and a building battery.

The gateway 106 is operatively coupled to a cloud computing system 110. The gateway 106 can be hardwired (e.g., via Ethernet) to a network device of a guest Internet, such as a network device in a local area network, to gain access to a private or public network to access the cloud computing system 110. The gateway 106 can communicate with the cloud computing system 110 over Cat 5 wiring using the TCP/IP protocol with TLS (SSL) for secure communications. The gateway 106 can communicate with the cloud computing system 110 using secure communications, such as using IPV4 or IPv6 networking protocols. The cloud computing system 110 can provide control logic, glare control, and configuration for the electrochromic window system 100. The gateway 106 bridges networks, but does not act as a system controller. The cloud computing system 110 can provide automation algorithms, data analytics, user management, security protocols, and the like. The cloud computing system 110 can provide extensive system health monitoring, proactive troubleshooting, as well as provide third-party integration without complicated on-site technical support. The cloud computing system 110 can provide a system dashboard to a dashboard web app 140 on a desktop computer, a dashboard mobile app 142 on a personal computing device, or both. The dashboard web app 140 and the dashboard mobile app 142 can be used to monitor or control the electrochromic window system 100. The cloud computing system 110 can also interact with other devices or networks, such as illustrated in FIG. 1 with a second cloud computing system 146 that communicates with a voice-controlled device 144. For example, the voice-controlled device 144 may receive audible commands from a user to control or get a report of the electrochromic window system 100. The dashboard web app 140 and the dashboard mobile app 142 can communicate with the cloud computing system 110 using the TCP/IP protocol with TLS (SSL) and using encryption and authentication for secure communications. The cloud computing system 110 can include a microservice architecture that is exposed through application programming interfaces (APIs) to manage interaction with onsite components, such as the gateways, drivers, and tint selectors. The cloud computing system 110 can eliminate complicated onsite networking requirements, as the external control occurs through the APIs. The cloud computing system 110 can provide centralized data aggregation from all deployments to facilitate automation and analytics. The cloud computing system 110 can leverage existing authentication and authorization technologies to secure site access. The cloud computing system provides a robust platform that facilitates on-demand load scaling and health monitoring.

The cloud computing system 110 can also provide a better path for onsite workload migration, backed by a robust central cloud store.

As described above, the gateway 106 communicates directly with the cloud computing system 110 through secured channel(s). The gateway 106 communicates with the cloud computing system 110 on behalf of the set of drivers 104 and the distributed EMS 102. The gateway 106, the set of drivers 104, and the distributed EMS 102 communicate with each over wireless connections, such as over a secure thread wireless network. For example, each of these components can communicate using IEEE 802.15.4, 2.4 GHz, IPv6 mesh network routing (thread). These communications can be encrypted with 128-bit AES encryption. Alternatively, other mesh networks can be used, as well as other frequencies, and encryption techniques.

As illustrated in FIG. 1, the electrochromic window system 100 may include additional devices, such as a tint selector 120, an occupancy sensor 122, an occupancy sensor interface and thread range extender 138, a building sensor 124 (e.g., roof mounted irradiance sensor), a sensor hub 126. The sensor hub 126 can be powered by an external power supply 136 and can be hardwired to the guest Internet, much like the gateway 106. The occupancy sensor interface and thread range extender 138 and occupancy sensor 122 can be powered by an external power supply and can send or receive signals to or from a lighting system or a building management system (BMS). The tint selector 120 and occupancy sensor interface and thread range extender 138 can communicate with other devices on the wireless mesh network. The tint selector 120 can be a device that is mounted on a wall where a user can activate a transition of the EC window 130. The tint selector 120 can be mounted or otherwise disposed in a building having the EC windows 130 to permit user control of the set of EC windows. The tint selector 120 can be programmed to be part of group of EC windows. That is the tint selector 120 can be associated with the set of drivers 104 and the gateway 106. Alternatively, the tint selector 120 can be associated with a scene of one or more EC windows, or the like. The electrochromic window system 100 can have one or more additional tint selectors, such as illustrated in FIG. 1 by a second tint selector 128 that is also wirelessly coupled to the wireless mesh network. The second tint selector 128 can be associated with the same group or scene as the tint selector 120. Alternatively, the second tint selector 128 can be associated with a different group or a different scene as the tint selector 120.

In a further embodiment, the electrochromic window system 100 can include one or more cabinets, such as illustrated in FIG. 1 with a second cabinet 118. The second cabinet 118 can include a second distributed EMS 112 and a second set of drivers 114. In some cases, the second cabinet 118 does not include a second gateway and the gateway 106 manages the second set of drivers 114 as well. An external power supply 134 is coupled to provide external power to the second distributed EMS 112 and the second set of drivers 114 within the second cabinet 118. For example, 16 AWG 2 conductor plenum cables can provide lower voltage (48V) or higher voltage (110-240V) to the second cabinet 118. The external power supply 134 can be located in proximity to the second cabinet 118 or farther away from the second cabinet 118, such as up to 350 feet. In other cases, more than two cabinets may be used. It should also be noted that additional external power supplies can be used to power the components in the first cabinet 108 and the second cabinet 118.

Each component of the electrochromic window system 100 can be designed to automatically obtain critical operating data from the cloud computing system 110 to avoid a single failure requiring significant maintenance downtime. Although various components are illustrated in FIG. 1, in other embodiments, the electrochromic window system 100 may include more or less components than as illustrated in FIG. 1. In another embodiment, a driver for an electrochromic window may be integrated into the window itself in either the frame of the window or in the integrated glass unit (IGU) of the window.

In another embodiment, the electrochromic window system 100 includes drivers 160 located at each of the set of EC windows 130, instead of or in addition to the set of drivers 104 in the first cabinet 108. In some cases, each EC window 130 has a driver 160, as illustrated. In other cases, a single driver 160 can drive multiple EC windows 130. The drivers 160 can be coupled to an external power supply. The external power supply can be located at the EC window 130 or in close proximity. In this case, the external power supplies for the set of EC windows 130 can be considered to be distributed, instead of centralized as described above. In other cases, the drivers 160 do not use an external power supply.

It should be noted that various embodiments described herein are described with respect to a commercial installation. In other embodiments, the electrochromic window system 100 can be deployed in a residential installation. In those cases, there may be modifications to the electrochromic window system 100 as described above to accommodate differences between the commercial installation and the residential installation.

Figure 2A:
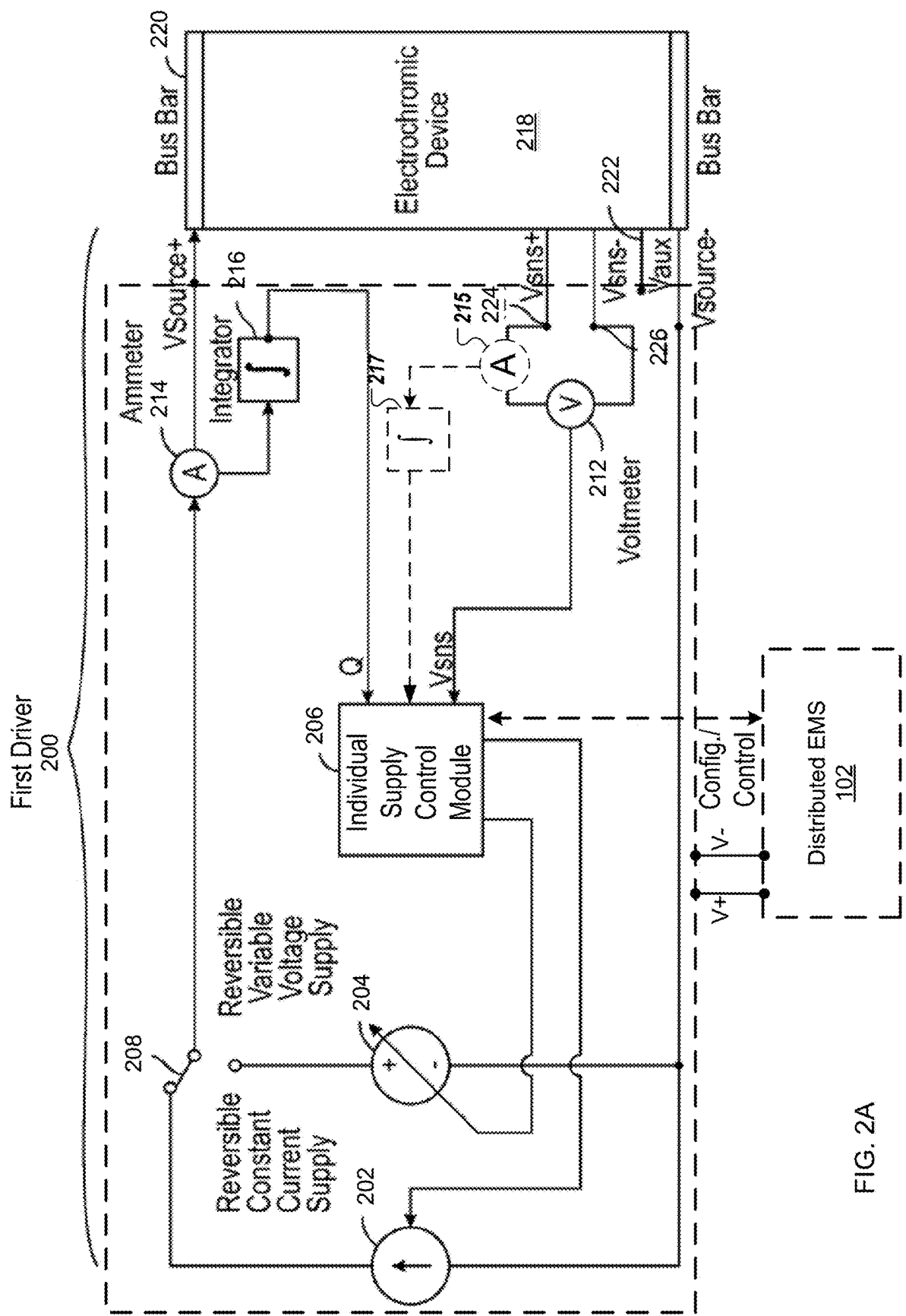
FIG. 2A is a system diagram of a driver and an electrochromic device, in accordance with some embodiments.

FIG. 2A is a system diagram of a driver 200 and an electrochromic device 218, in accordance with some embodiments. The driver 200 is coupled to the distributed EMS 102 as described above with respect to FIG. 1. The distributed EMS 102 provides power to the driver 200. The distributed EMS 102 can also send or receive configuration and control information to and from the driver 200. The driver 200 applies a constant current from a reversible constant current supply 202 to the electrochromic device 218 during certain phases of operation, and applies a variable voltage from a reversible variable voltage supply 204 to the electrochromic device 218 during further phases of operation. Voltage and current are generally applied to the bus bars 220 of the electrochromic device 218, although in some embodiments of the electrochromic device 218, a charge sequestration terminal "SEQ" (labeled Vaux) 222 is available for further operation, e.g., to sequester charge. In the embodiment shown, one of the bus bars 220 is labeled "VSOURCE+" and another one of the bus bars 220 is labeled "VSOURCE−", so that polarity of the reversible constant current supply 202 and polarity of the reversible variable voltage supply 204 can be determined relative to the bus bar 220 connections. It should be appreciated that the term "reversible" refers to the polarity of the current from the reversible constant current supply 202 as being able to be reversed, so that the reversible constant current supply 202 provides current for either charging or discharging the electrochromic device 218. Similarly, polarity of the voltage from the reversible variable voltage supply 204 can be reversed, so that the reversible variable voltage supply 204 provides a variable amount of voltage (or current) for either charging or discharging the electrochromic device 218. Voltage and current of a first polarity are supplied for charging the electrochromic device 218 towards a first transmissivity, and voltage and current of a second polarity are supplied for discharging the electrochromic device 218 towards a second transmissivity.

In certain cases, the electrochromic device includes, in succession, a first substrate, a first electrically conductive layer, a first electrode, an ion conductor, a second electrode, a second electrically conductive layer, and a second substrate. The two bus bars 220 depicted in FIG. 2A can be electrically connected to the two electrically conductive layers, and therefore one bus bar 220 is associated with one electrode (e.g. the anode) and the other bus bar 220 is associated with the other electrode (e.g. the cathode).

A voltmeter 212 measures a sense voltage, labeled "Vsns", at the sense voltage terminals 224, 226 of the electrochromic device 218. One of the sense voltage terminals 224 is labeled "VSNS+", and another one of the sense voltage terminals 226 is labeled "VSNS−", so that polarity of a measurement of the sense voltage can be determined relative to the sense voltage terminals 224, 226. Other labels are readily devised. In the embodiment shown, the sense voltage terminals 224, 226 are distinct from the bus bars 220, and are located elsewhere than a location of the bus bars 220. A sense voltage terminal 234 could be connected to an interior region of the electrochromic device 218, or various sense voltage terminals 224, 226, 228, could be located along an edge of the electrochromic device 218. Edge locations may be preferable for a gradient type of electrochromic device 218, in which a transmissivity gradient is produced from top to bottom, bottom to top, left to right, right to left or other arrangement. Interior locations may be preferable to detect whether a bull's-eye effect is present. For example, a sense voltage could be taken across an upper region, a middle region, or a lower region of the electrochromic device 218 through suitable terminals, e.g., pairs of sense voltage terminals. Alternatively, a sense voltage could be taken from a sense voltage terminal 224, 226, relative to one of the bus bars 220. In some cases, the two or more sense voltage terminals (e.g., 224 and 226) are electrically connected to the two electrodes of the device (i.e., the anode and cathode).

Sense voltage terminals located at certain spatial locations of the device would provide a measurement of the cell potential (i.e., voltage between the anode and cathode) of the device at a those spatial locations. In some cases, each sense voltage terminal is designed to have a minimal voltage drop between the electrode (i.e. anode or cathode) and the voltmeter 212. The impedance of the sense circuit between the electrodes and the voltmeter 212 can be high, which will make the reading at the voltmeter 212 be close to the actual voltage condition of the electrode location near the sense voltage terminal. In order to measure a specific location within the device, each sense voltage terminal connections to the electrodes (i.e., anode and cathode) can be electrically isolated from the electrically conductive layers. Electrical isolation of each sense terminal can be beneficial because the electrically conductive layers will provide low resistance connections to many locations of the electrodes.

A pair of sense voltage terminals can be connected to the two electrodes (i.e. anode and cathode) in the same or different locations, when viewed from above. In some cases, one sense voltage terminal is at one location on one electrode, and a second sense voltage terminal is located directly above the first on the other electrode. In some cases, one sense voltage terminal is at one location on one electrode, and a second sense voltage terminal is on the other electrode at a different location that has approximately the same cell potential.

In some cases the sense voltage terminals can be directly connected to the bus bars. In other words, one or both of the sense voltage terminals 224 and/or 226 in FIG. 2A could connect to one or both bus bars 220. In some cases, sense voltage terminal 224 is connected to a bus bar 220 associated with one electrode, and the other sense voltage terminal 226 is connected to the other electrode at a location other than a bus bar 220.

In some cases, there are two or more sets of sense voltage terminals, with each set having two sense voltage terminals, where one is electrically connected to one electrode and the other is electrically connected to the other electrode. More than one set allows two independent measurements of the open circuit voltage to be obtained and compared with each other. This is beneficial since in such examples there is a fail-safe, or redundancy, in the system to protect the system from errors or damaged connections associated with one or more sense voltage terminals.

Ammeter 214 measures current supplied to the electrochromic device 218. In the embodiment shown, the ammeter 214 is in line with the VSOURCE+ bus bar 220, although in further embodiments the ammeter 214 could be in line with the VSOURCE− bus bar 220. Alternatively, the ammeter can be in line with the VSNS+ terminal 224, such as illustrated as ammeter 215, or in line with the VSNS− terminal 224.

Still referring to FIG. 2A, integrator 216 receives the output of the ammeter 214, and integrates this over time to produce a value "Q", which is equal to, proportional to, related to, or represents the amount of charge transferred to the electrochromic device 218 over a span of time. In the case where the ammeter 215 is used in line with the VSNS+ terminal 224, an integrator 217 can receive the output of the ammeter 214 and integrated this over time to provide a value "Q," which is equal to, proportional to, related to, or represents the amount of charge transferred to the electrochromic device 218 over a span of time. The integrator 216 and the ammeter 214 (or the integrator 217 and the ammeter 215) perform a calculation that determines the total amount of charge as equal to or related to the integral of the current into the electrochromic device 218 from a first time to a second time, i.e., over a span of time or a time interval. The driver 200 can track a current count of coulombs already in the electrochromic device 218 and track how many coulombs go in and out of the electrochromic device 218. For example, the driver 200 can determine an amount of charge transferred to the electrochromic device 218 as a function of time and current supplied to the electrochromic device 218. The driver 200 can monitor the sense voltage in view of a first sense voltage limit and can monitor the amount of charge being transferred to the electrochromic device 218. The driver 200 can determine that the amount of charge reaches an overcharge limit before the sense voltage reaches the first sense voltage limit. Responsive to the amount of charge reaching the overcharge limit before the sense voltage reaches the first sense voltage limit, the driver 200 sets the sense voltage as a second sense voltage limit (e.g., a Vsense limit dependent on higher temperatures) that is lower than the first sense voltage limit, ceases the constant supply current from the power supply, and applies one of a variable voltage or a variable current to the electrochromic device from the power supply to maintain a sense voltage at the second sense voltage limit, instead of the first sense voltage limit. However, if the driver determines that the first sense voltage limit is reached before the amount of charge reaches the charge limit, the driver 200 ceases the constant supply current and applies one of the variable voltage or the variable current to maintain a sense voltage at the first sense voltage limit. By tracking the current count of coulombs, the driver 200 can provide an overcharge protection failsafe. The driver 200 can use the coulombs count and the predefined sense voltage limit to switch between a constant current mode and a variable voltage/variable current mode.

It should be appreciated that the polarity of the charge, the polarity of the current and the polarity of the voltage are interrelated, and that a negative amount of charge transferred to the electrochromic device 218 is equivalent to a positive amount of charge transferred from the electrochromic device 218, and a positive amount of charge transferred to the electrochromic device 218 is equivalent to a negative amount of charge transferred from the electrochromic device 218, in some embodiments. The phrase "charge transferred to the electrochromic device 218" can be descriptive of both charging and discharging the electrochromic device 218.

Continuing with FIG. 2A, an individual supply control module 206 (also referred to as power supply control module) receives the charge value "Q" from the integrator 216, receives the sense voltage from the voltmeter 212, and controls the reversible constant current supply 202, the reversible variable voltage supply 204, and a switch 208. The switch selects either the reversible constant current supply 202 or the reversible variable voltage supply 204 and couples the selected power supply to the electrochromic device 218. In the embodiment shown, the switch 208 connects the selected power supply to the ammeter, which is in line with one of the bus bars 220. In further embodiments, the switch could connect the selected power supply directly to the bus bar 220. In further embodiments, the reversible constant current supply 202 can be supplied by the external power supply or the multi-device boost power supply (or just a local boost power supply) or both the external power supply and the multi-device boost power supply, and the reversible variable voltage supply 204 can be supplied by the external power supply or the multi-device boost power supply or both the external power supply and the multi-device boost power supply. The individual supply control module 206 determines, based on the charge value and the sense voltage, whether to apply current or voltage, and the polarity of current or voltage to apply to the electrochromic device 218. Also, the individual supply control module 206 determines a target amount of charge to be transferred to the electrochromic device 218 based on the difference between the present transmissivity, or assumed transmissivity, of the electrochromic device 218 and a target transmissivity of the electrochromic device 218 in some embodiments. These functions can be accomplished with tables, algebraic calculations, and/or various algorithms in various embodiments as readily devised in accordance with some embodiments. One example of a relationship between optical transmission state and transferred charge for an exemplary EC device is T2=T1*10(−CE*deltaQ), where T1 is current transmission state, T2 is target transmission state, CE is coloration efficiency (in the units of (optical density*cm2)/C), and deltaQ is the amount of charge to be transferred to change from state T1 to state T2 (in units of C/cm2). For instance, in an exemplary device with a CE of 50 optical density*cm2/C, to change from a state of 90% transmission to 2% transmission would require roughly 25 mC/cm2 be transferred. Various processes and phases of operation of driver 200 are further described below with reference to FIGS. 2B-2D.

It should be appreciated that the embodiment illustrated in FIG. 2A of the driver 200 is not meant to be limiting. For example, the reversible constant current supply 202, the reversible variable voltage supply 204 and the switch 208 could be combined in a single, more complex power supply in some embodiments. This power supply is capable of supplying constant current, variable voltage, and reversing polarity in some embodiments. Alternatively, the reversible constant current supply 202 could be implemented as a single polarity constant current supply, with switches for reversing the polarity. The reversible variable voltage supply 204 could be implemented as a single polarity variable voltage supply, with switches for reversing the polarity. The reversible constant current supply 202 can also be a reversible variable current supply in some cases. In variations of these embodiments, the reversible constant current supply 202 can be supplied by different power supplies such as by the external power supply or the multi-device boost power supply or both the external power supply and the multi-device boost power supply, and the reversible variable voltage supply 204 can be supplied by different power supplies such as by the external power supply or the multi-device boost power supply or both the external power supply and the multi-device boost power supply. The switch 208, or other switches in various embodiments of power supplies, could be implemented using relays, solid-state switches, or modes of operation of one or more power supplies. The voltmeter 212 could be implemented using an analog-to-digital converter in some embodiments. The ammeter 214 could be implemented using a low resistance value resistor and an analog-to-digital converter, a Hall effect sensor, an inductive sensor or other sensor, with or without an analog-to-digital converter, or various further devices for detecting current. It should also be noted that in other embodiments, a control method can be used where sense wires are not used.

The integrator 216 (or integrator 217) could be an analog integrator, for example based on an operational amplifier with a capacitor in a feedback loop. In some embodiments, the integrator 216 (or integrator 217) could include a digital adder or arithmetic logic unit, such as found in digital signal processors. In digital embodiments, the integrator 216 (or integrator 217) could be implemented as a time-series summation of digitally converted values of the current supplied to the electrochromic device. A digital signal processor, or a microprocessor or a controller could be applied to perform such calculations and may be included in the individual supply control module 206. For example, a digital signal processor or a microprocessor with on-chip analog-to-digital conversion could implement the current sensing, the voltage sensing and the integration, as well as the control algorithms applied to the power supply or supplies. In some embodiments, the analog-to-digital converter could be separate from the digital signal processor or the microprocessor. Various further combinations of analog circuitry, digital circuitry, state machines and/or software programming, discrete components, system-on-chip, etc. are readily devised in keeping with the teachings disclosed herein.

In some embodiments, the reversible constant current supply 202 and the reversible variable voltage supply 204 can be powered by the collective power from the distributed EMS 102 of FIG. 1. That is the distributed EMS 102 can provide power from the external power supply and power from the multi-device boost power supply described above. As described herein, the individual supply control module 206 can receive power state information from the distributed EMS 102 via a radio and configuration information and control information from the gateway 106 (not illustrated in FIG. 2A) via the radio. Although not illustrated in FIG. 2A, the distributed EMS 102 can provide the power state information to other drivers and the gateway 106 can provide the configuration information and control information to other drivers.

In other embodiments, the reversible constant current supply 202 and the reversible variable voltage supply 204 can be powered by an external power supply and a local boost power supply, such as from a local battery.

Figure 2B:
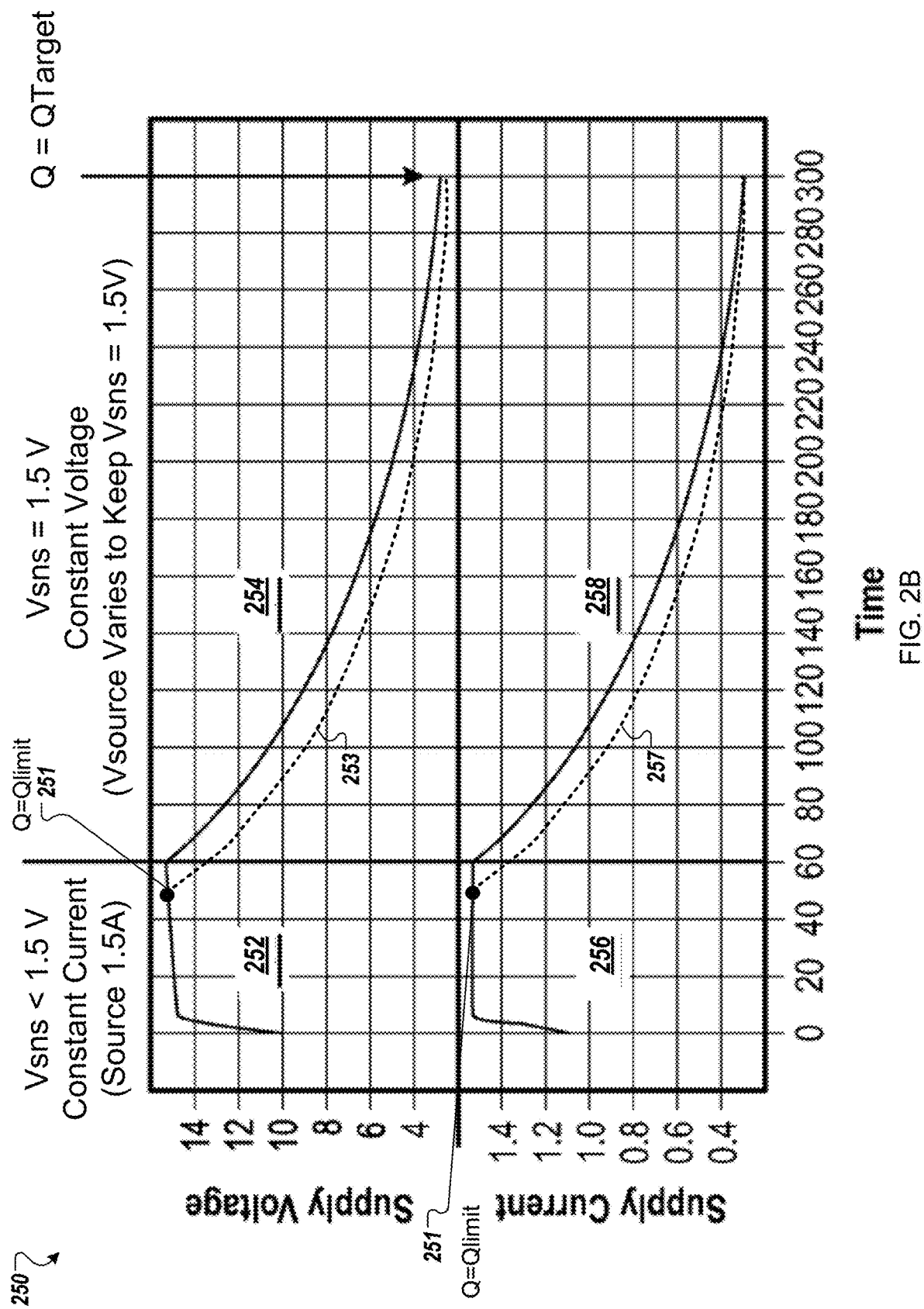
FIG. 2B is a graph illustrating a voltage and current versus time while discharging the electrochromic device with the driver of FIG. 2A according to one embodiment.

FIG. 2B is a graph 250 illustrating a voltage and current versus time while discharging the electrochromic device with the driver of FIG. 2A according to one embodiment. The y-axis of the graph 250 is a voltage (in volts) and a current (in amps) and the x-axis of the graph 250 is time (in seconds). Graph 250 graph depicts charging the electrochromic device with the driver 200 of FIG. 2A in some embodiments. Four regions 252, 254, 256, 258 are shown in the graph. Two of the regions 252, 254 depict supply voltage versus time, and two of the regions 256, 258 depict supply current versus time. The horizontal axis is in seconds of time. The example is for a specific electrochromic device, e.g. a window, and may differ for other electrochromic devices and various dimensions of variations of the electrochromic device. Illustrated in the graph of FIG. 2B, there is an initial, upward spike in both supply voltage and supply current, from time T=zero, for the first few seconds of operation. In the region 256, constant current is applied up until about sixty seconds of time. The voltage rises slightly, from about 14½ V (volts) to about 15 V during this time, as seen in the region 252. In the constant current region 252, 256, the sense voltage is less than a target sense voltage of 1.5 V, and the constant current source provides about 1½ A (amps) to the electrochromic device 218. In another embodiment, the target sense voltage is 1.7 V. Alternatively, the target sense voltage can be other voltages, such as in a range between 0.1 V and 3.5 V.

Continuing with FIG. 2B, at time T=sixty seconds, the sense voltage reaches the target sense voltage of 1.5 V, and the driver 200 switches from constant current to a variable voltage or a variable current to maintain the sense voltage at 1.5 V. In the region 254, the supply voltage is observed to drop from about 15 V down to about 3 V over the next four minutes (e.g., from sixty seconds to three hundred seconds), as the sense voltage is maintained at a constant voltage equal to the target sense voltage. In the region 258, the supply current is observed to drop from about 1.5 A down to about 0.2 A (i.e., about 1½ A down to about 1/5 A), again while maintaining the sense voltage at a constant voltage. It should be noted that the supply current of 1.5 A depends on the geometry of the electrochromic device, for example the length to height ratio of the electrochromic device. The sense voltage can be maintained at the target sense voltage by controlling a variable voltage applied to the bus bars of the electrochromic device in some embodiments. Alternatively, the sense voltage can be maintained at the target sense voltage by controlling a variable current applied to the bus bars of the electrochromic device. At time T=three hundred seconds, the right end of the graph, the charge in the electrochromic device has reached the target charge Qtarget, and the driver 200 stops supplying the variable voltage (or the variable current) to the electrochromic device. In other words, the driver 200 ceases supplying voltage and current to the electrochromic device. The four wire open circuit voltage process and the check state of charge process can then take place. In other cases, the transfer of charge can be stopped after a set time duration elapses.

Continuing with FIG. 2B, in addition to tracking the sense voltage, the driver 200 can track an amount of charge transferred to the electrochromic device. The driver 200 can determine whether the sense voltage reaches a first sense voltage limit (e.g., 1.5 V as illustrated in FIG. 2B) as described above. However, in some cases, the driver 200 determines that the amount of charge reaches an overcharge limit 251 (Q=Qlimit) before the sense voltage reaches the first sense voltage limit (e.g., 1.5 V). Responsive to the amount of charge reaching the overcharge limit 251 before the sense voltage reaches the first sense voltage limit, the driver 200 transitions to the constant voltage mode. The driver 200 can set the measured sense voltage set as a second sense voltage limit that is lower than the first sense voltage limit. The driver 200 ceases the constant current mode and switches to the constant voltage mode in which the driver 200 applies one of a variable voltage or a variable current to the electrochromic device from the power supply to maintain a sense voltage at the second sense voltage limit, instead of at the first sense voltage limit (e.g., 1.5 V). In the constant voltage mode, the driver 200 determines whether the amount of charge transferred to the electrochromic device reaches a target amount of charge (Q=Qtarget). Responsive to the amount of charge reaching the target amount of charge, the driver 200 terminates the constant voltage mode. The driver 200 can transition to an idle mode, for example, after terminating the variable voltage or variable current from being applied to the electrochromic device in the constant voltage mode. The dotted curve 253 shows a positive supply voltage varying over time to keep the sense voltage at the second sense voltage limit and the dotted curve 257 show a positive supply current varying over time to keep the sense voltage at the second sense voltage limit. The dotted curve 253 (and dotted curve 257) shows that the variable positive voltage (or positive current) is applied between when the charge limit (Qlimit) is reached (to prevent overcharging) and when the charge reaches the target amount of charge (QTarget).

Figure 2C:
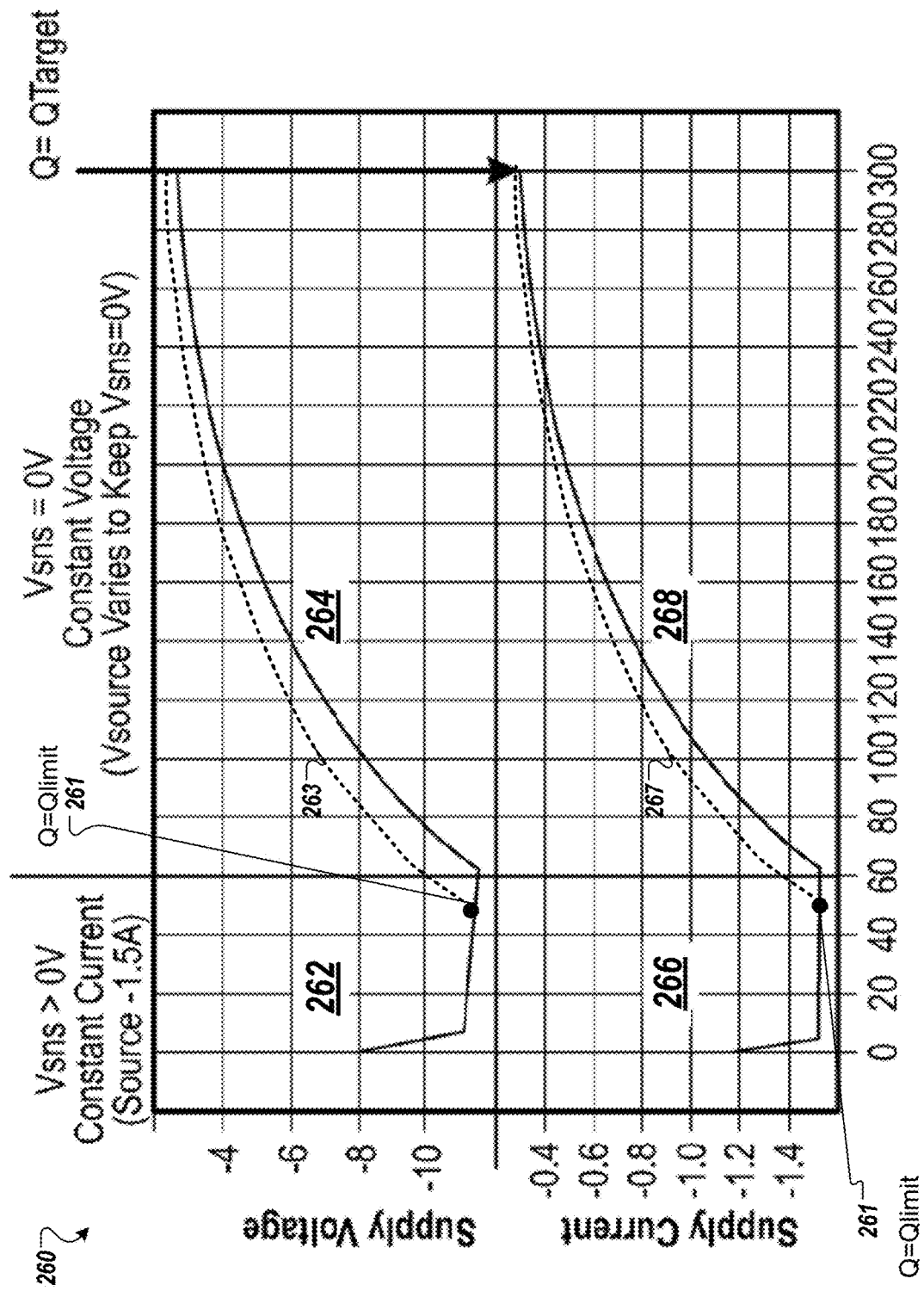
FIG. 2C is a graph showing power supplied to an electrochromic device over time according to one embodiment.

FIG. 2C is a graph 260 showing power supplied to an electrochromic device over time according to one embodiment. The y-axis of the graph 260 is a voltage (in volts) and current (in amps) and the x-axis of the graph 260 is time (in seconds). Graph 260 graph depicts discharging the electrochromic device with the driver 200 of FIG. 2A in some embodiments. The graph of FIG. 2C appears inverted as compared to the graph of FIG. 2B, and the voltages and currents are negative, i.e., opposite polarity as compared to those of FIG. 2B. Otherwise, operation in this mode is similar as described with reference to FIG. 2B. There is an initial, downward (i.e., negative) spike in both supply voltage and supply current, from time T=zero, for the first few seconds of operation. In the region 266, constant current is applied up until about sixty seconds of time. The voltage falls slightly (i.e., magnitude increases slightly in a negative direction), from about −11 V to about −11½ V during this time, as seen in the region 262. In the constant current region 266, 262, the sense voltage is greater than a target sense voltage of 0 V, and the constant current source provides about −1½ A (amps) to the electrochromic device.

At time T=sixty seconds in FIG. 2C, the sense voltage reaches the target sense voltage of 0 V, and the driver 200 switches from constant current to a variable voltage (or a variable current) to maintain the sense voltage at 0 V. In the region 264, the supply voltage is observed to increase from about −11½ V up to about −2½ V (decreasing in magnitude) over the next four minutes (e.g., from sixty seconds to three hundred seconds), as the sense voltage is maintained at a constant voltage equal to the target sense voltage (i.e., 0 V). In the region 268, the supply current is observed to increase from about −1.5 A up to about −0.2 A or −0.3 A (i.e., about −1½ A up to about −1/4 A, a decrease in magnitude), again while maintaining the sense voltage at a constant voltage (of 0 V). At time T=three hundred seconds, the right end of the graph, the charge in the electrochromic device has reached the target charge Qtarget, and the driver 200 stops supplying the variable voltage (or the variable current) to the electrochromic device, i.e., the driver 200 stops supplying current or voltage to the electrochromic device. The four wire open circuit voltage process and the check state of charge process can then take place. In other cases, the transfer of charge can be stopped after a set time duration elapses.

Continuing with FIG. 2C, in addition to tracking the sense voltage, the driver 200 can track the charge transferred to the electrochromic device as set forth above with respect to FIG. 2B. The graph 260 includes dashed curve 263 and dashed curve 267. The dashed curve 263 shows a negative supply voltage varying over time to keep the sense voltage at the second sense voltage limit and the dashed curve 267 show a negative supply current varying over time to keep the sense voltage at the second sense voltage limit. The dashed curve 263 (and dashed curve 267) shows that the variable negative voltage (or negative current) is applied between when the charge limit (Qlimit) 261 is reached (to prevent overcharging) and when the charge reaches the target amount of charge (QTarget).

The graphs shown in FIGS. 2A and 2B apply to full charge and full discharge of the electrochromic device, respectively. Full charge achieves minimum transmissivity of the electrochromic device, and full discharge achieves maximum transmissivity of the electrochromic device in some embodiments. Partial charge or partial discharge of the electrochromic device achieves various intermediate amounts of transmissivity of the electrochromic device, and may have differing values of target charge and sense voltage, accordingly.

One example of a charge/discharge protocol for the electrochromic device is shown in Table 1 below, similarly to the actions shown in FIGS. 2A and 2B. This protocol can be practiced by the individual supply control module 206 of FIG. 2A.

TABLE 1

Use CCCCV (constant current, charge constant voltage) sourcing with 4 W sensing
Full Charge/Partial Charge/Partial Discharge:
Apply constant supply current
Measure sense voltage and supply current (count charge Qsource)
Stop step when Qsource = Qtarget
IF
Qsource reaches Qlimit (overcharge limit based on temperature)
Vlimit = Set measured sense voltage
THEN
switch to constant voltage mode
Hold Vsns = Vlimit until Qsource = Qtarget.
IF TABLE 1-continued sense voltage reaches Vlimit (before Qsource reaches Qlimit)
THEN
switch to constant voltage mode
Hold Vsns = Vlimit until Qsource = Qtarget.
Full Discharge:
Apply constant supply current
Measure sense voltage and supply current (count charge Qsource)
IF
sense voltage reaches 0 V
THEN
switch to constant voltage mode.
Hold Vsns = Vlimit until Qsource = Qtarget.

The above protocol applies a non-zero sense voltage limit for full charge, partial charge, and partial discharge, and a 0 V sense voltage limit for full discharge. In the full charge, partial charge and partial discharge, the constant supply current is stopped when the total amount of charge transferred to the electrochromic device reaches the target amount of charge to be in the electrochromic device, or when the sense voltage reaches the sense voltage limit, whichever comes first. If the sense voltage is reached, but the target amount of charge is not yet reached, the constant voltage mode applies a variable voltage to the electrochromic device and holds the sense voltage at the sense voltage limit (i.e., the constant voltage) until the target amount of charge is reached in the electrochromic device. Using the overcharging failsafe descried herein, if the amount of charge reaches a charge limit (Qlimit) before the sense voltage is reached, but the target amount of charge is not yet reached, the constant voltage mode applies a variable voltage to the electrochromic device and holds the sense voltage at the second voltage limit (i.e., the constant voltage) until the target amount of charge is reached in the electrochromic device. This second voltage limit is lower than a first voltage limit that corresponds to a sense voltage limit of the electrochromic device when operating at room temperature. As such, the second voltage limit corresponds to a higher temperature than room temperature and, by limiting the sense voltage to the second voltage limit, the driver can protect the electrochromic device from overcharging as described herein. The first sense voltage limit can be stored in memory as a predefined value that corresponds to a sense voltage limit of the electrochromic device at room temperature. The memory can store sense voltage limits for different electrochromic devices, as well. In other cases, the constant current, variable voltage, and/or transfer of charge is stopped after a set time duration elapses. In another example, where the device is set to fully discharge, the sense voltage limit is 0 V, and this is held for a total of five minutes (or some other predetermined time span) while the variable voltage is applied. Constant current (to the electrochromic device) and constant voltage (of the sense voltage) are used, with four wire sensing in some embodiments. That is, there are four wires to the electrochromic device, two of which (attached to the bus bars) are used for supplying current and voltage, and two of which (attached to the sense voltage terminals) are used for the sense voltage. In full charge, partial charge, partial discharge, and full discharge, charge is counted by measuring the supply current (which is integrated over time, or discreetly summed as a digital approximation of an integral over time). The charge count is related to how much charge (i.e., electrons) is transferred to the electrochromic device over time through one of the bus bars, and is applied to the determination of whether the total amount of charge transferred to the electrochromic device has reached a target amount of charge. In other cases, the transfer of charge is stopped after a set time duration elapses. The term "constant current—constant voltage" sourcing, refers to having two stages or phases applied to rapid transmissivity change, namely a first stage of applying constant current to the electrochromic device 218, and a second stage of maintaining constant sense voltage of the electrochromic device 218.

Figure 2D:
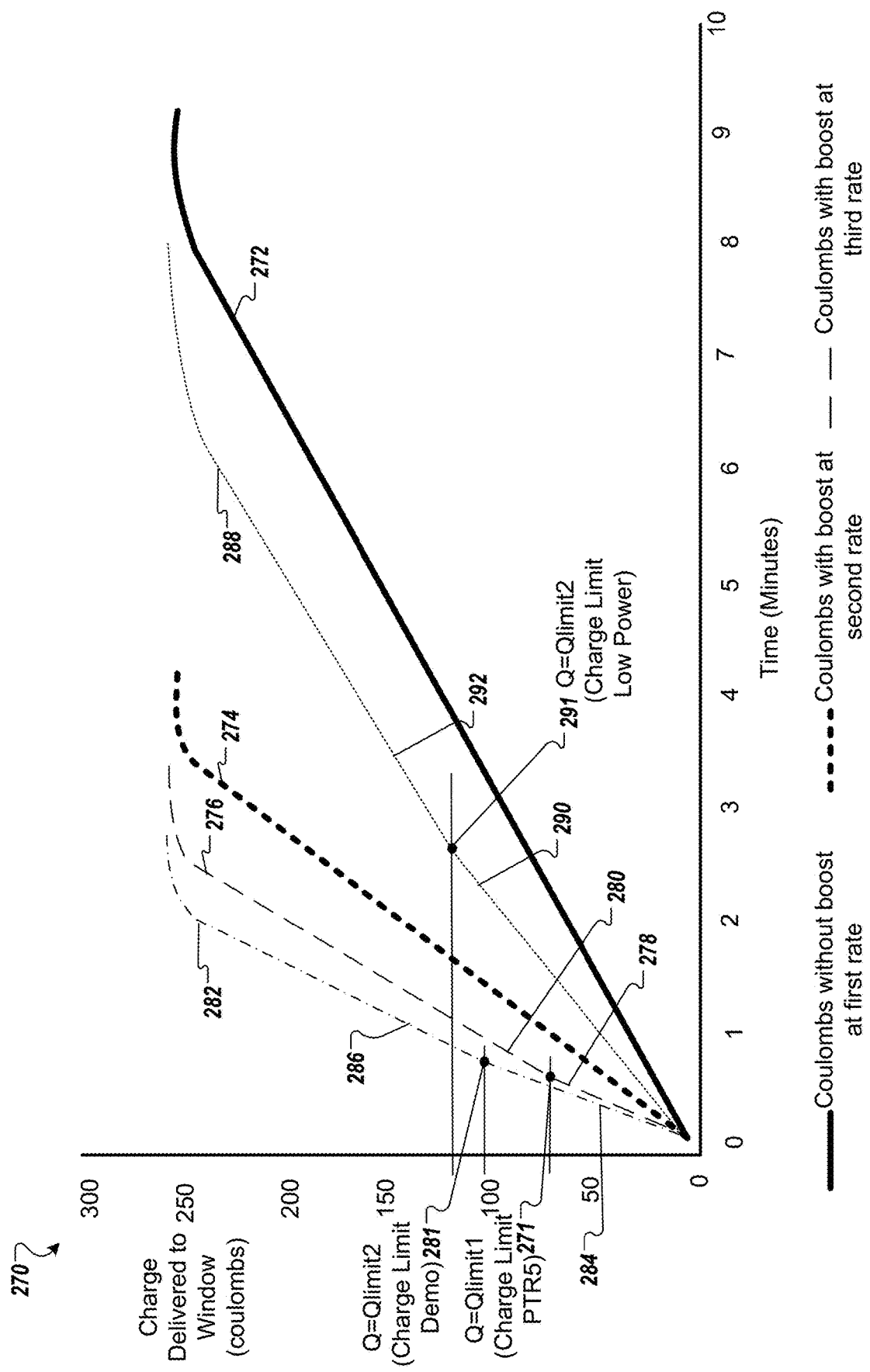
FIG. 2D is a graph illustrating charge delivered without a boost power supply at a first rate, with the boost power at a second rate, and with the boost power at a third rate according to one embodiment.

FIG. 2D is a graph 270 illustrating charge delivered without a boost power supply at a first rate, with the boost power at a second rate, and with the boost power at a third rate according to one embodiment. The y-axis is charge delivered to the electrochromic device in coulombs and the x-axis is time. The electrochromic device is in this example is an electrochromic window that is approximately rectangular with the dimensions 0.8×1.4 m. This particular device requires approximately 250 C of charge to switch from a first optical transmission state to a second optical transmission state. Alternatively, other sizes of electrochromic windows can be used but would have different charge requirements. The solid curve 272 shows the charge delivered over time to an electrochromic device from an external power supply that is configured to supply a limited amount of power. The maximum amount of power that the external power supply can supply to the window in this example is approximately 500 W. The window takes approximately 8.5 minutes to switch from the initial optical transmission state to the final optical transmission state.

A first dashed curve 274 shows the charge delivered over time to an electrochromic device from the same external power supply as above that is configured to supply a limited amount of power, and a boost power supply (e.g., a multi-device boost power supply or a local boost power supply). The first dashed curve 274 shows the charge delivered over time at a second rate when the electrochromic device is at room temperature. The maximum amount of power that the external power supply can supply to the window again 500 W. However, in this case, the driver for the electrochromic window determines that the window requires more power than the limited amount of power that can be supplied by the external power supply, and the boost power supply is supplying power to the electrochromic window. The boost power supply in this example includes a set of one or more lithium iron phosphate batteries with a capacity of 240 Wh, which at 50V is 4800 mAh. In one embodiment, the boost power supply can have a total capacity of approximately 243 Wh, or 5 Ah or 18 kC with a peak power capacity of approximately 3120 W (e.g., 48.75V*64 A=3120 W (peak)). Alternatively, the total capacity can vary and include more or less total capacity and/or peak power capacity. In this example, the window takes approximately 3.5 minutes to switch from the initial optical transmission state to the final optical transmission state. In one embodiment, the multi-device boost power supply (battery pack) of the distributed EMS can supply approximately 2862 W with a peak voltage of 42V. The maximum power it can supply to one window is dependent on the impedance of the panel. For example, a 5'×10' panel has an effective resistance of about 5.25 Ohms, which allows about 8A when held at a voltage potential of 42V. This results in 336 Watts being supplied to the window. An external power supply can supply power that is dependent on how big of external power supply is provided. For example, the external power supply can supply 500 W, 48 V, and 10A. The driver can step the voltage down to at least 42V and the panel impedance can limit the current to approximately 8A at 52 V, so one external 500 W power supply can be as functional as the multi-device boost power supply for a single window of 5'×10' size. The battery capacity can be 240 Wh. At 50V, the battery can provide 4800 mAh. In another embodiment, the battery capacity can be 243 Wh. At 48.75V, the battery can provide 5Ah and 3120 W peak power.

A second dashed curve 276 shows the charge delivered over time to an electrochromic device from the same external power supply as above that is configured to supply a limited amount of power, and a boost power supply (e.g., a multi-device boost power supply or a local boost power supply). The second dashed curve 276 shows the charge delivered over time at a third rate 278 and a fourth rate 280 when the electrochromic device is at a temperature that is higher than room temperature. As described herein, as the charge is delivered to the electrochromic device at the temperature that is higher than room temperature, the electrochromic device receives more charge. The driver 200 applies a constant current to the electrochromic device, delivering charge to the electrochromic device over time at the third rate 278 when the electrochromic device is at a temperature that is higher than room temperature. The third rate 278 is faster than the second rate of the first dashed curve 274 because of the higher temperature. As a result, the amount of charge reaches a first charge limit (Qlimit1) 271 before a first sense voltage limit (e.g., 1.5 V) is reached. The first charge limit (Qlimit1) 271 can be programmed for a first power mode (e.g., PTRS mode) in which a boost power supply is used to charge about 80% of the final optical transmission state. The first charge limit (Qlimit1) 271 is set to provide overcharge protection while in the first power mode. Once the amount of charge reaches the first charge limit (Qlimit1) 271, a second sense voltage limit is set. The second sense voltage can be set using the sense voltage measured when the first charge limit (Qlimit1) 271 was reached. The second sense voltage is lower than the first sense voltage limit used for the first dashed curve 274. The driver 200 applies a variable voltage or current, delivering charge to the electrochromic device over time at the fourth rate 280 when the electrochromic device is at a temperature that is higher than room temperature. The fourth rate 280 is slower than the third rate 278.

A third dashed curve 282 shows the charge delivered over time to an electrochromic device from the same external power supply as above that is configured to supply a limited amount of power, and a boost power supply (e.g., a multi-device boost power supply or a local boost power supply). The third dashed curve 282 shows the charge delivered over time at a fifth rate 284 and a sixth rate 286 when the electrochromic device is at a temperature that is higher than room temperature and the system is in a second power mode, such as a demo mode. As described herein, as the charge is delivered to the electrochromic device at the temperature that is higher than room temperature, the electrochromic device receives more charge. The driver 200 applies a constant current to the electrochromic device, delivering charge to the electrochromic device over time at the fifth rate 284 when the electrochromic device is at a temperature that is higher than room temperature. The fifth rate 284 is faster than the second rate of the first dashed curve 274 because of the higher temperature. As a result, the amount of charge reaches a second charge limit (Qlimit2) 281 before a first sense voltage limit (e.g., 1.5 V) is reached. The second charge limit (Qlimit2) 281 can be programmed for the second power mode in which a boost power supply is used to charge the panel to the final optical transmission state as quickly as possible. The second charge limit (Qlimit1) 281 is set to provide overcharge protection while in the second power mode. Once the amount of charge reaches the second charge limit (Qlimit2) 281, a second sense voltage limit is set. The second sense voltage can be set using the sense voltage measured when the second charge limit (Qlimit2) 281 was reached. The second sense voltage is lower than the first sense voltage limit used for the first dashed curve 274. The driver 200 applies a variable voltage or current, delivering charge to the electrochromic device over time at the sixth rate 286 when the electrochromic device is at a temperature that is higher than room temperature. The sixth rate 286 is slower than the fifth rate 284.

A fourth dashed curve 282 shows the charge delivered over time to an electrochromic device from the same external power supply as above that is configured to supply a limited amount of power while in a third power mode (e.g., lower power state). The maximum amount of power that the external power supply can supply to the window again 500 W. The fourth dashed curve 288 shows the charge delivered over time at a seventh rate 290 and an eighth rate 292 when the electrochromic device is at a temperature that is higher than room temperature and the system is in the third power mode (low power mode). As described herein, as the charge is delivered to the electrochromic device at the temperature that is higher than room temperature, the electrochromic device receives more charge. The driver 200 applies a constant current to the electrochromic device, delivering charge to the electrochromic device over time at the seventh rate 290 when the electrochromic device is at a temperature that is higher than room temperature. The seventh rate 290 is faster than the first rate of the solid curve 272 because of the higher temperature. As a result, the amount of charge reaches a third charge limit (Qlimit3) 291 before a first sense voltage limit (e.g., 1.5 V) is reached. The third charge limit (Qlimit3) 291 can be programmed for the third power mode in which the limited power supply is used to charge the panel to the final optical transmission state as quickly as possible with the limited power. The third charge limit (Qlimit3) 291 is set to provide overcharge protection while in the third power mode. Once the amount of charge reaches the third charge limit (Qlimit3) 291, a second sense voltage limit is set. The second sense voltage can be set using the sense voltage measured when the third charge limit (Qlimit3) 291 was reached. The second sense voltage is lower than the first sense voltage limit used for the solid curve 272. The driver 200 applies a variable voltage or current, delivering charge to the electrochromic device over time at the eighth rate 292 when the electrochromic device is at a temperature that is higher than room temperature. The eighth rate 292 is slower than the seventh rate 290.

As illustrated in FIG. 2D, the charge limit (Qlimit) can be set for each power mode. Alternatively, the same charge limit (Qlimit) can be used for multiple power modes. The charge limit (Qlimit) provides overcharge protection regardless of the power mode being used. It should be noted that the rates and times illustrated and described with respect to the various Q limits are not drawn to scale and are provided as examples of how the rate of charge changes after the specific charge limit (Qlimit) is reached before the sense voltage limits because of higher temperatures.

This example illustrates some common design limitations often imposed on electrochromic window systems that have effects on the window switching speed. The external power supply is often constrained to be small and therefore only capable of supplying a limited amount of power, due to constraints on system cost and power consumption efficiency. The size and current carrying capacity of the wires connecting the external power supply to the window are also often constrained, due to constraints on system cost and window integration into architectural designs. Both a low power external power supply and low current carrying capacity connecting wires limit the amount of power that can be supplied to the electrochromic window, which limits the switching speed of the device. The multi-device boost power supply that is located local to the electrochromic device solves these problems. A local power supply that is capable of delivering large amounts of power when the window is switching can increase the switching speed of the window. While the window is not switching the external power supply can be supplying small amounts of power to recharge the local power supply. Since the external power supply is sized appropriately to supply low power, the overall energy consumption efficiency of the system increases. The local multi-device boost power supply does add cost to the system, but the added cost is far less than the cost that would be required to achieve the fast switching speed with larger external power supplies and larger wires connecting the external power supplies to the window.

Figure 3:
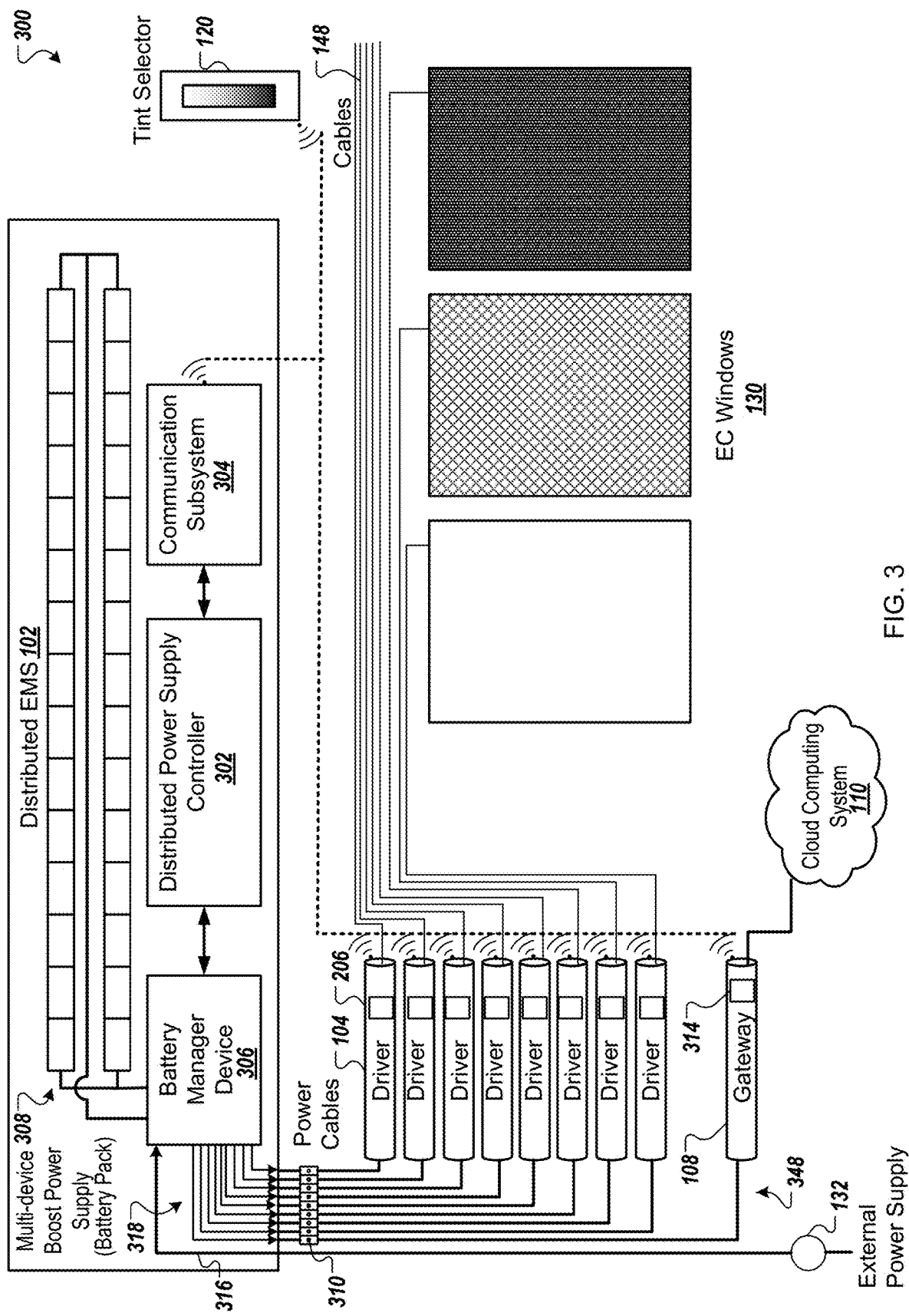
FIG. 3 is a block diagram of a distributed EMS according to one embodiment.

FIG. 3 is a block diagram of a distributed EMS according to one embodiment. The distributed EMS of FIG. 3 corresponds to the distributed EMS 102 of FIG. 1. Alternatively, the distributed EMS can correspond to the distributed EMS 112 of FIG. 1. The distributed EMS 102 includes a multi-device boost power supply 308, a distributed power supply controller 302, a communication subsystem 304, and a battery manager device 306. The communication subsystem 304 can include one or more wireless interfaces, one or more wired interfaces, or any combination thereof. The communication subsystem 304 can include one or more radios, one or more wired transceiver (e.g., Universal Asynchronous Receiver/Transmitter (UART), power line communication (PLC) transceiver, or the like. The communication subsystem 304 can wirelessly communicate with the set of drivers 104 and the gateway 106. The communication subsystem 304 can also wirelessly communicate with the tint selector 120 as described herein. Alternatively, the communication subsystem 304 can communicate with the set of drivers 104, the gateway 106, the tint selector 120, or any combination thereof, over one or more wired connections or even over power lines.

The multi-device boost power supply 308 can include various power supply sources, such as a set of batteries. The set of batteries may be organized as a battery pack of multiple battery cells. The set of batteries can be lithium iron phosphate batteries. Alternatively, the batteries can be other types of batteries or energy storage types as described herein. As illustrated in FIG. 3, the set of batteries can include a first set of battery cells coupled in series and a second set of battery cells coupled in series. The first set of battery cells is coupled in parallel to the second set of battery cells. The multi-device boost power supply 308 can connect several cells in series to achieve a desired operating voltage and can use the parallel connections between the sets of cells to attain higher capacity by adding up the total ampere-hour (Ah). In one embodiment, the distributed EMS 102 can supply 50V and 100A. In one embodiment, the multi-device boost power supply 308 can have a total capacity of approximately 243 Wh, or 5 Ah or 18 kC with a peak power capacity of approximately 3120 W (e.g., 48.75V*64A=3120 W (peak)). Alternatively, the total capacity can vary and include more or less total capacity and/or peak power capacity. The multi-device boost power supply 308 can support a varied number of windows based on geometry and size of the windows, how often the windows are tinted, as well as how low the batteries of the distributed EMS 102 can be discharged.

In some implementations, the multi-device boost power supply 308 of the distributed EMS is located more than 1 meter away from at least one of the set of EC windows 130. In other embodiments, the multi-device boost power supply 308 is located in close proximity to at least one of the EC windows 130.

The battery manager device 306 is coupled to an external power supply interface 316 that is coupled to the external power supply 132. The battery manager device 306 is coupled to a driver interface 318 that is coupled to the set of drivers 104 and the gateway 106 via power cables 348. The driver interface 318 can be coupled to a T-block to manage the power cables 348 within the first cabinet 108. The set of drivers 104 and the gateway 106 are coupled to the EC windows 130 via power cables 148. The battery manager device 306 is also coupled to the distributed power supply controller 302. The battery manager device 306 manages the multi-device boost power supply 308, such as to control of charging and discharging of the multi-device boost power supply 308. For example, the battery manager device 306 includes technology to charge and discharge a set of batteries. The battery manager device 306 can balance usage of battery cells, protect the battery cells, and the like. The battery manager device 306 can be a standalone integrated circuit, such as a System on Chip (SoC). Alternatively, the functionality of the battery manager device 306 can be integrated with the functionality of the distributed power supply controller 302 described below. In other embodiments, other power manager devices can be used when the multi-device boost power supply 308 contains energy storage that is not necessarily batteries.

The distributed power supply controller 302 is coupled between the battery manager device 306 and the communication subsystem 304. The distributed power supply controller 302 can be a standalone integrated circuit, such as a System on Chip (SoC). In some cases, the communication subsystem 304 can be integrated in the same integrated circuit as the distributed power supply controller 302. For example, the distributed power supply controller 302 can be a thread processor and the communication subsystem 304 can handle wireless communications for the distributed power supply controller 302 over the secure thread wireless network (e.g., mesh network using IEEE 802.15.4, 2.4 GHz, IPv6 mesh network routing). In another embodiment, the communication subsystem 304 can be a standalone integrated circuit that is separate from the distributed power supply controller 302. Alternatively, the functionality of the distributed power supply controller 302, battery manager device 306, and communication subsystem 304 can be integrated in a single integrated circuit, such as EMS circuitry described herein.

In one embodiment, the distributed power supply controller 302 can determine a charge capacity of the multi-device boost power supply 308. This can be done in connection with the battery manager device 306. For example, the battery manager device 306 can track the charge capacity and report an indication of the charge capacity to the distributed power supply controller 302. The distributed power supply controller 302 can determine a power state of the multi-device boost power supply 308 using at least the charge capacity. In addition to the current charge capacity, the distributed power supply controller 302 can use other historical data, signals received from the tint selector 120, or other data to determine the power state. Once the power state is determined, the distributed power supply controller 302 can send an indicator of the power state to the set of drivers 104 via the communication subsystem 304. The indicator is also referred to herein as state indicator, power state indicator, or simply power state. Alternatively, the distributed power supply controller 302 can send the indicator of the power state to the gateway 106 via the communication subsystem 304. The send an indicator of the power state to the set of drivers via the radio can communicate the power state to the set of drivers 104, as well as the gateway 106. For example, the distributed power supply controller 302 can generate a message via the communication subsystem 304, such as a message communicated through the mesh network. Once a device receives the message it can forward the message to other devices in the mesh network. In this manner, other devices can be notified quickly of the power state and any changes to the power state quickly. The power state information provided to the gateway 106 can also be shared with the cloud computing system 110.

The distributed EMS 102 can supply power to the set of drivers 104 according to a state of the set of EC window 130, as well as the power state of the multi-device boost power supply 308. For example, the distributed EMS 102 can supply a first amount of power to the set of drivers 104 from the external power supply interface 316 in an idle state of the set of EC windows 130. Alternatively, the distributed EMS 102 does not supply power to the set of EC windows 130 in the idle state. The state of the EC windows 130 can also correspond to states of the distributed EMS 102, the respective driver, or both. For example, when one of the set of EC windows 130 is in an idle state, the respective driver can be considered to be in an idle state. The distributed EMS 102 can supply a second amount of power to the set of drivers from the external power supply interface 316 and from the multi-device boost power supply 308 in a switching state of at least one of the set of EC windows 130 while the multi-device boost power supply 308 is in a first power state and supply a third amount of power to the set of drivers 104 from the external power supply interface 316 and from the multi-device boost power supply 308 in the switching state of at least one of the set of EC windows 130 while the multi-device boost power supply 308 is in a second power state that is a lower power state than the first power state. Supplying the second amount of power over time charges the respective EC window 130 at a first charging rate and supplying the third amount of power over time charges the respective EC window 130 at a second charging rate that is lower than the first charging rate.

In one embodiment, the distributed power supply controller 302 sends a first control signal to the battery manager device 306 to disconnect the multi-device boost power supply 308 from the driver interface 318 in the idle state. The distributed power supply controller 302 sends a second control signal to the battery manager device 306 to connect the multi-device boost power supply 308 to the driver interface 318 in the switching state while in the first power state. The distributed power supply controller 302 sends a third control signal to the battery manager device 306 to connect the multi-device boost power supply 308 to the driver interface 318 in the switching state while in the second power state. Alternatively, additional control signals can be sent between the battery manager device 306 and the distributed power supply controller 302 to control power supplied to the set of drivers 104.

In one embodiment, the distributed power supply controller 302 can detect a power loss event on the external power supply interface 316. For example, the battery manager device 306 can detect and report the power loss event to the distributed power supply controller 302 and the distributed power supply controller 302 can send a power loss indicator to the gateway 106 and the set of drivers 104. In another embodiment, the distributed EMS 102 can detect a power loss event and broadcast a power loss state to the set of drivers 104 and the gateway 106.

In another embodiment, the distributed power supply controller 302 can determine that the charge capacity of the multi-device boost power supply 308 is a first amount. The distributed power supply controller 302 determines whether the first amount satisfies a threshold criterion. For example, the threshold criterion can specify that the charge capacity is above a certain percentage, or above a certain charge capacity amount or threshold. Responsive to the first amount satisfying the threshold criterion, the distributed power supply controller 302 determines that the multi-device boost power supply 308 is in the first power state (e.g., a normal power state). Responsive to the first amount not satisfying the threshold criterion, the distributed power supply controller 302 determines that the multi-device boost power supply 308 is in the second power state (e.g., a low power state). Also, the convention of the threshold criterion can be reversed where, responsive to satisfying the threshold criterion, the distributed power supply controller 302 determines that the multi-device boost power supply is in the second power state (e.g., the low power state). Also, responsive to the first amount not satisfying the threshold criterion, the distributed power supply controller 302 determines that the multi-device boost power supply 308 is in the first power state (e.g., the normal power state). In other implementations, the distributed power supply controller 302 can use multiple threshold criterion and multiple power states. For example, the distributed power supply controller 302 can determine that the charge capacity of the multi-device boost power supply is a first amount and can determine whether the first amount is in a first range corresponding to the first power state, in a second range corresponding to the second power state, and even in a third range corresponding to a third power state and so forth.

In a further embodiment, the distributed power supply controller 302 can use additional information to determine the power state. For example, the distributed power supply controller 302 can receive a switch control signal from the tint selector 120 via the communication subsystem 304 while in the second power state. The distributed power supply controller 302 can switch the power state of the multi-device boost power supply 308 from the second power state to the first power state. Alternatively, the distributed power supply controller 302 can switch the power state from the second power state to a third power state.

As described herein, the distributed power supply controller 302 can wirelessly communicate via the communication subsystem 304 with the set of drivers 104 and the gateway 106 via a mesh network protocol. The distributed power supply controller 302 can send the indicator of the power state by broadcasting a message via the mesh network protocol. The message can include a bitmask that identifies a group that includes the set of drivers 104 and the gateway 106. The group may also include the second set of drivers 114 of FIG. 114. In other implementations, the bitmask can identify a scene, a sub-group, or the like. The bitmask is used to permit devices on the mesh network to recognize messages directed to them so the device can act accordingly.

In some embodiments, the distributed power supply controller 302 can store historical usage data regarding the multi-device boost power supply 308. The historical usage data can be tracked and stored by the battery manager device 306 and retrieved by the distributed power supply controller 302. Alternatively, the battery manager device 306 can collect the usage data and report it to the distributed power supply controller 302 and the distributed power supply controller 302 can store the usage data. The distributed power supply controller 302 can send the historical usage data to the gateway 106 via the radio and the gateway 106 can send the historical usage data to the cloud computing system 110 for monitoring and analytics.

In a further embodiment as illustrated in FIG. 3, the distributed power supply controller 302 can wirelessly communicate with an individual power supply control module 206 of each driver in the set of drivers 104. The individual power supply control module 206 can include local logic with power state consideration. That is, the local logic can operate with consideration of the power state of the distributed EMS 102. For example, a first driver includes a first individual power supply control module 206. A second driver includes a second individual power supply control module 206 and so forth for each of the drivers in the set of drivers 104. The individual power supply control module 206 can operate according to a configuration file stored at the respective driver. The individual power supply control module 206 can receive the indicator of the power state from the distributed EMS 103, such as being broadcast by the communication subsystem 304. Responsive to the indicator of the power state, the individual power supply control module 206 can switch between operating parameters specified in the configuration file. For example, the configuration file can specify operating parameters of the respective driver when in the normal power state and can specify different operating parameters when in a low power state. The operating parameters may include a charge rate, a discharge rate, a maximum power permitted, a maximum current permitted, an amount to be used for Vsense, or the like. The operating parameters may also specify sequestration operations. As described herein, the configuration files can be generated by the cloud computing system 110 and provided to the respective drivers via the gateway 106.

In a further embodiment as illustrated in FIG. 3, the distributed power supply controller 302 can wirelessly communicate with a control module 314 of the gateway 106. The control module 314 can store a schedule that manages gateway operations and timing of the gateway operations. The schedule can be used to manage when particular drivers are to operate in a certain way at a certain time. The control module 314 can also receive the indicator of the power state from the distributed power supply controller 302 and respond accordingly. In some cases, the control module 314 can receive a power loss indicator from the distributed EMS 102 to indicate a power loss event on the external power supply 132. Responsive to receiving the power loss indicator, the gateway 106 can perform a set of one or more operations, such as transition the EC windows to a known, safe state, notifying the cloud computing system 110, or the like.

It should be noted that the embodiments described with respect to FIGS. 1-3 are directed to EC windows. The EC windows can have a switching time of less than five minutes from a maximum optical transmissivity state to a minimum optical transmissivity state. In some cases, such as in the lower power state, the switching time can be more than five minutes. Also, for some designs the speed of switching is relaxed and the switching time is more than five minutes in some cases. An electrochromic device including a gradient transparent conductive layer can have very fast switching speed (e.g., less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The term "gradient transparent conductive layer" refers to an electrically conducting layer with spatially varying sheet resistance, or resistance to current flow substantially parallel to a major surface of the layer, that varies as a function of position within the electrically conductive layer. The gradient transparent conductive layer or layers also enable the driving of an electrochromic device incorporating such a layer at much higher voltages so that high amounts of power are required initially to drive fast switching. The gradient transparent conductive layer may be a patterned or graded transparent conductive oxide (TCO) such as indium titanium oxide and tantalum tin oxide though. In other embodiments, the distributed EMS 102 can be used in connection with drivers that driver other types of electrochromic devices. Additionally, the distributed EMS can be used to drive multi-panel electrochromic windows that include more than one electrochromic device connected in series or parallel. A multi-panel electrochromic window may be one where the electrochromic devices are stacked over one another to provide very low transmissivity of light through the devices, for example less than 1% transmissivity of light or less than 0.1% transmissivity of light. Alternatively the multi-panel electrochromic windows may be "tiled" adjacent to one another such that more than one electrochromic device is laminated to a carrier glass substrate to form larger sized windows. In another embodiment a single driver may be used to drive multiple electrochromic windows that may be in a group of electrochromic windows. For example a single driver may drive 2 or more electrochromic windows.

Figure 4:
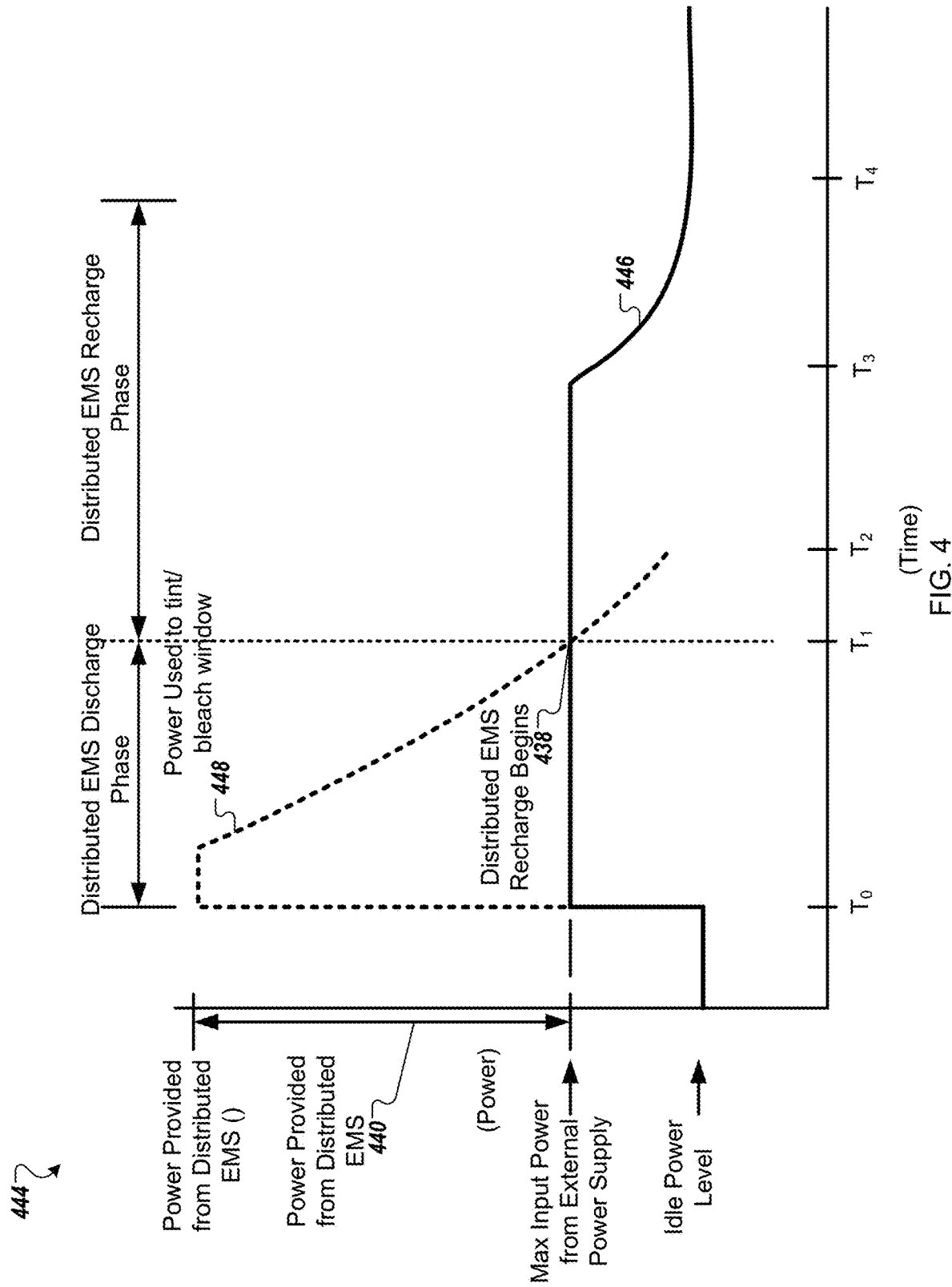
FIG. 4 is a graph 400 illustrating a voltage and current versus time while charging the electrochromic device with the driver of FIG. 3 according to one embodiment.

FIG. 4 is a graph 400 illustrating a voltage and current versus time while charging the electrochromic device with the driver of FIG. 3 according to one embodiment. The y-axis of the graph 400 is power and the x-axis of the graph 400 is time. The solid curve 402 is the power supplied from the external power supply. The dotted curve 404 is the power required to charge (or discharge) the electrochromic device during switching. The dotted curve 404 also represents the power provided by the boost power supply (e.g., a multi-device boost power supply or a local boost power supply). At times less than a time, t0, the electrochromic device is in an idle state, and the power supplied by the external power supply is the idle power level. In some embodiments the idle power level may be zero, for example when the type of EC device used only requires power to switch from one optical transmission state to another optical transmission state. At time t0 the electrochromic device begins switching from one optical transmission state to another optical transmission state (i.e., charging or discharging) and the power required is greater than the maximum input power that can be supplied by the external power supply (i.e., the limited amount of power, or the max input power). Since the power required at time t0 is greater than the limited amount of power (i.e., the max input power), the boost power supply supplies power to the electrochromic device. In some cases, when the power required by the electrochromic device is greater than the limited amount of power that can be supplied from the external power supply, the power can be supplied by both the external power supply and the boost power supply. The power required by the electrochromic device between time t0 and time t1 reaches a maximum, and then begins to decrease. In some cases, there may be a plateau of high power required by the electrochromic device, and a period requiring decreasing levels of power. At time t1 the power required by the electrochromic device decreases below the limited amount of power that can be delivered by the external power supply, and at that point the power supplied to the electrochromic device can be supplied by the external power supply alone. At time t2, the electrochromic device no longer requires power for switching from one optical transmission state to another optical transmission state, however, in some embodiments some power may still be required from the electrochromic device to maintain the given state of optical transmission.

In some embodiments, the boost power supply includes a rechargeable battery. After time t1, the amount of power required by the electrochromic device is less than the limited amount of power that can be supplied by the external power supply, and the external power supply can begin to recharge the battery for the boost power supply. In some cases, at time t3 the battery is close to being fully charged, and the power supplied to recharge the battery for the boost power supply is reduced. At time t4, the battery is fully charged, and the external power supply can stop providing power to the battery for the boost power supply. At time t4, the external power supply can return to providing the idle power level if needed.

In some cases, the electrochromic device external power supply recharges the battery of the multi-device boost power supply, and reduces the power supplied to charge the battery when the battery is more than 70% charged, or more than 80% charged or more than 90% charged, or more than 95% charged.

As described herein, in some cases, the distributed EMS can be in different power states and can notify the drivers of the different power states. For example, the driver can be powered by the power provided from the distributed EMS (normal state) as well as the power provided from the external power supply during transition as set forth above. However, when the distributed EMS is in a lower power state, the driver can be powered by the power provided from the distributed EMS (lower power state) as well as the power provided from the external power supply during transition. The driver can accommodate the lower power state by supplying a lower amount of power over a greater period of time to charge or discharge the electrochromic device.

When using a distributed EMS, the drivers do not necessarily need a local power supply as done conventionally. A driver (also referred to as electrochromic device driver) for driving electrochromic devices such as electrochromic glass is described below. The driver can charge and discharge an electrochromic device reliably, repeatedly and without exceeding a safe operating realm for the device. In order to do so, the driver can monitor a level of electric charge that is transferred to the electrochromic device, and provides a constant current to the electrochromic device so long as a sense voltage does not exceed a sense voltage limit (Vsene limit) or the amount of charge does not exceed a charge limit (Qlimit). If the sense voltage limit is reached, the driver changes to a variable voltage, or a variable current, that is applied to keep the sense voltage at the sense voltage limit. If the charge limit is reached, the driver the driver changes to a variable voltage, or a variable current, that is applied to keep the sense voltage at a second sense voltage limit that is less than the sense voltage limit. The embodiments described in more detail below protect the electrochromic device from damage.

In some cases, voltage and current application cease when the amount of charge transferred to the electrochromic device meets a target amount of charge. In some cases, this is when the electrochromic device is at, or assumed to be at, a target level of optical transmissivity. Various embodiments may have multiple power supplies or a single, more complex power supply, and have analog or digital components for determining charge transfer and controlling the power supply or supplies. In some embodiments, the electrochromic device has an external power supply and a multi-device boost power supply connected to the driver to charge and discharge the electrochromic device. In other embodiments, the electrochromic device has an external power supply and a local boost power supply connected to the driver or disposed within the same housing as the driver to charge and discharge the electrochromic device.

In most circumstances, the device maintains charge neutrality, and charge is merely moved from one electrode to the other. It follows that the amount of charge transferred to the device is the amount of electrons transferred to the device through one bus bar alone. During switching, electrons are transferred to the device through one bus bar, and an equivalent amount of electrons will be transferred from the device through the other bus bar to maintain charge neutrality. In some cases, the amount of charge transferred to the device will be defined as 0% when all of the transportable charge within the device resides in the anode and 100% when all of the transportable charge within the devices resides in the cathode. Transportable charge is the amount of charge that can move in the system at a particular device voltage. Certain degradation mechanisms can increase or decrease the total transportable charge in the device (e.g., spurious oxidation), however, this excess charge will be periodically eliminated via the sequestration process (described more completely herein).

Figure 5A:
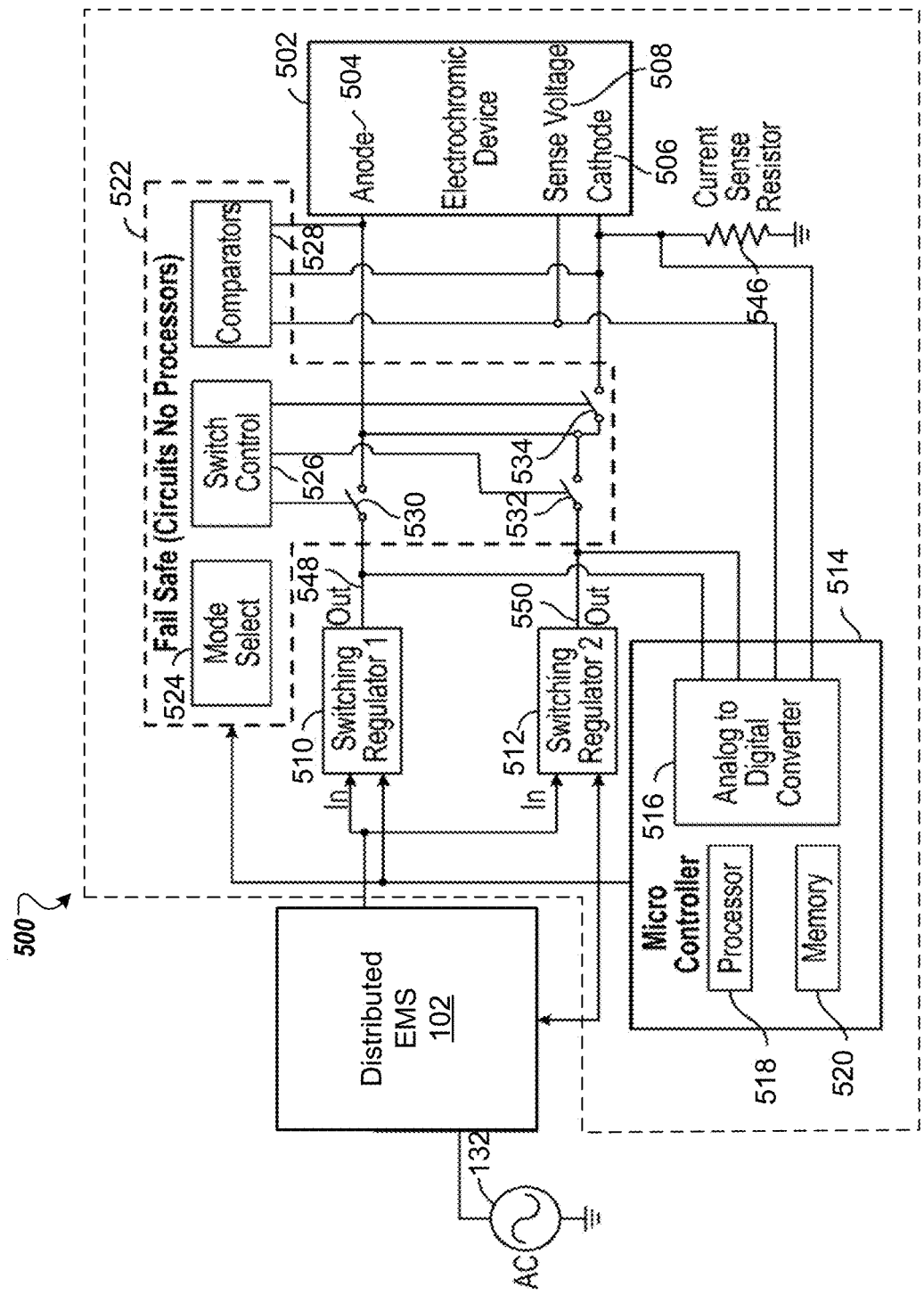
FIG. 5A is a block diagram showing details of a dual rail driver for an electrochromic device, with dual switching regulators, and a failsafe circuit with mode selection and switch control according to one embodiment.

FIG. 5A is a block diagram showing details of a dual rail driver 500 for an electrochromic device 502, with dual switching regulators 510, 512, and a failsafe circuit 522 with a mode selection module 524 and switch control module 526. In this embodiment, the electrochromic device 502 has a cathode 506 that is grounded through a current sense resistor 546, and an anode 504 that can be driven with a positive voltage and current as supplied by the first switching regulator 510, and can be driven by a negative voltage and current as supplied by the second switching regulator 512. Variations are contemplated, in which the anode 504 is grounded and the cathode 506 is driven, or both the anode 504 and cathode 506 can be driven to charge (e.g., tint) and discharge (e.g., bleach) the electrochromic device 502. This embodiment has a sense voltage 508 terminal for the electrochromic device 502, although versions without the sense voltage 508 terminal are possible. A further version of an electrochromic device 502 has a sequestration terminal, which can be driven (e.g., through another switch, from one of the switching regulators or another switching regulator in further embodiments) to sequester charge in the electrochromic device 502. Still further versions of electrochromic devices 502 could be used, such as series and/or parallel combinations or arrangements of the electrochromic devices 502, for example to make multipanel electrochromic devices or compose a larger electrochromic device from multiple, smaller electrochromic devices.

The dual rail driver has two switching regulators 510, 512, and switches 530, 532 to connect one or the other of the switching regulators 510, 512 to the driven terminal, in this case the anode 504 of the electrochromic device 502. By using two switching regulators 510, 512, the first producing a positive voltage rail 548 and the second producing a negative voltage rail 450, the system has more efficient voltage and current generation and each of these can be tailored to different specifications for charging and discharging the electrochromic device 502. In one embodiment, the electrochromic device 502 is tinted by driving the anode 504, from the first switching regulator 510, to a constant voltage until the sense voltage 508 reaches a threshold, then driving a variable voltage or current to the anode 504 so as to maintain the sense voltage 508 at a constant, threshold level. Once the desired tinting level is reached, the switches 530, 532 are opened, drive from the positive voltage rail 548 is stopped, and the anode 504 terminal is allowed to float. The electrochromic device 502 is bleached by driving the anode 504, from the second switching regulator 512, to an opposite polarity voltage and current, until the sense voltage 508 reaches a negative threshold, then driving a variable voltage or current (again of opposite polarity to that of tinting) so as to maintain the sense voltage 508 at a constant, negative threshold. Once the discharge is complete or a desired tinting level is reached, the switch 532 is opened, drive from the negative voltage rail 550 is stopped, and the anode 504 is allowed to float. Drive levels and thresholds can be tailored for rapid, efficient tinting and bleaching of the electrochromic device 502, for example at drive voltage and current levels greater than in systems that lack the sense voltage terminal, resulting in more rapid tinting and bleaching.

The distributed EMS 102 provides power to the dual rail driver 500 using AC power 132 and/or DC power (e.g., from a battery or set of battery in the EMS 102) for supplying power to the switching regulators 510, 512. The distributed EMS 102 also manages battery charging and discharging for DC power. A microcontroller 514, with processor 518, memory 520, and analog-to-digital converter 516, controls the distributed EMS 102 and the switching regulators 510, 512, and provides input to the failsafe circuit/module 522 for control of the switches 530, 532, 534. Various voltages and/or currents from the electrochromic device 502 or sensors associated with the electrochromic device 502 (e.g., the current sense resistor 546) are connected as inputs to the analog-to-digital converter 516. The microcontroller monitors these voltages and/or currents as feedback from the switching regulators 510, 512 and the electrochromic device 502, and makes decisions about power selection and operation of the switching regulators 510, 512 and the switches 530, 532, 534, to charge, discharge or float the electrochromic device 502, or cease operations if any of the monitored voltages or currents is anomalous. However, the microcontroller 514, being operated by software or firmware, might experience a software or hardware failure of temporary or permanent nature.

The failsafe module 522, which is distinct from the microcontroller 514, monitors the voltages and/or currents from the electrochromic device 502 or sensors associated with the electrochromic device 502. In general, the failsafe module is configured to override one or more of the control signals responsive to detecting an anomaly of the electrochromic device. These voltages or currents are inputs to comparators 528 in the failsafe module. A mode select 525 in the failsafe module is user selectable for failsafe mode. For example, the mode select could be physical electromechanical switches that are manually settable, or could be a non-volatile memory writable by the user, with outputs to the switch control module 526. For first failsafe mode, in case of failure as determined by the failsafe module 522, the anode 504 and cathode 506 are disconnected from the switching regulators 510, 512 and allowed to float. For second failsafe mode, in case of failure as determined by the failsafe module 522, the anode 504 and cathode 506 are connected to each other and allowed to discharge the electrochromic device 502. The switch control module 526 receives input from the mode select module 524 and the comparators 528 output, and control signals from the microcontroller 514, and has outputs that operate the switches 530, 532, 534 that connect or disconnect the anode 504 and cathode 506 to the switching regulators 510, 512 or to each other (e.g., in case of failure, in the second failsafe mode). In some embodiments, the failsafe module 522 has only electronic circuits, and no processor. For example the failsafe module 522 could have various logic gates so that output from the comparators 528, if an out of range current or voltage is detected, override signals from the microcontroller 514 and set the switches 530, 532, 534 to open and disconnect the anode 504 from the first switching regulator 510 and disconnect the anode 504 from the second switching regulator 512 in case of failure, and close and connect the anode 504 and the cathode 506 to each other in the second failsafe mode in case of failure. Further embodiments of the failsafe module 522 and switches 530, 532, 534 are readily implemented for one or more failsafe features. Further monitoring and failsafe functions are readily designed into the failsafe module 522, in keeping with the teachings herein.

Figure 5B:
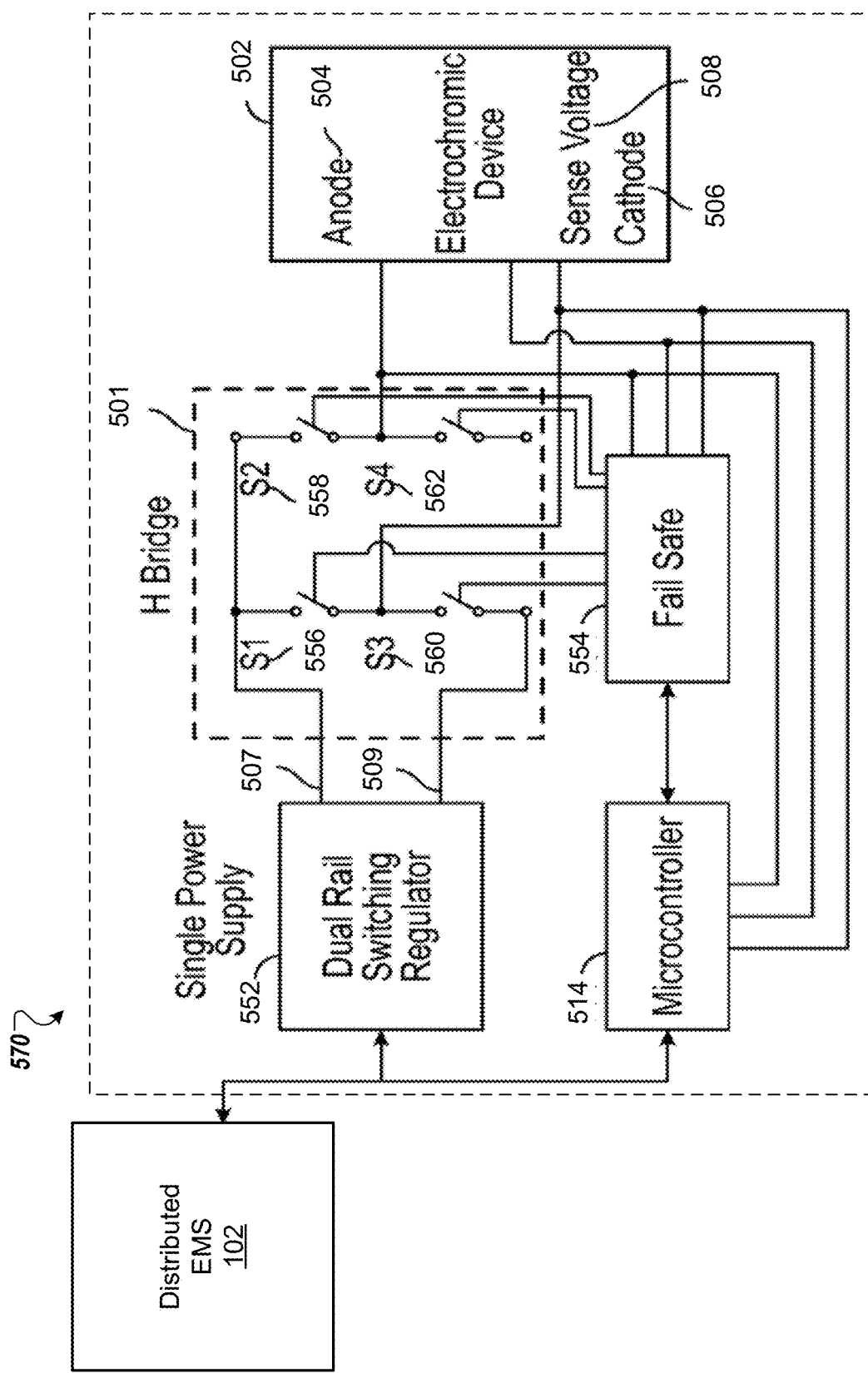
FIG. 5B is a block diagram of a single power supply, H bridge driver for an electrochromic device, with AC and DC power manager and a failsafe circuit according to one embodiment.

FIG. 5B is a block diagram of a single power supply 552, H bridge driver 570 for an electrochromic device 502, and a failsafe circuit 554. Instead of the dual power supplies of FIG. 5A, implemented with two switching regulators 510, 512, the single power supply 552 in the embodiment in FIG. 5B could be more compact, have fewer parts and possibly greater reliability, and/or could be designed to supply greater current, voltage or both in comparison with each of the dual power supplies. In one embodiment, the single power supply 552 is a dual rail switching regulator, although other types of power supplies are readily devised. One of the power supply rails 507, 509 could be ground, and the other of the power supply rails 507, 509 could be at a positive voltage or a negative voltage, or both the power supply rails 507, 509 could be floating relative to ground, in various embodiments. The positive rail 507 and the negative rail 509 of the single power supply 552 are connected to opposed terminals of a H bridge, e.g., upper and lower terminals in the orientation of the H bridge 501 shown in FIG. 5B. Switches 556, 558, 560, 562 of the H bridge 501 couple the two rails 507, 509 to the electrochromic device 502, e.g., to the anode 504 and cathode 506. The switches 556, 558, 560, 562 can also be used to electrically short the anode 504 and cathode 506 to each other for example in some failsafe mode, or, when open, to isolate the anode 504 and cathode 506 of the electrochromic device 502 from the single power supply 552 altogether.

An H bridge 501 has multiple advantages in circuitry for controlling electrochromic device(s) 502 in some embodiments. The switches 556, 558, 560, 562 perform double duty, and are used to connect the rails 507, 509 of the single power supply 552 to the electrochromic device 502 in one polarity for charging or tinting, and the opposite polarity for discharging or bleaching the electrochromic device 502. In addition, the switches 556, 558, 560, 562 can also be used to float the electrochromic device 502, or short out the electrochromic device 502, without needing extra switches or relays to disconnect the power supply from the electrochromic device 502 or short the anode 504 and cathode 506 to each other. It should be appreciated that this keeps the number of parts required for the device to a minimum. As described above, the H bridge 501 allows each of the rails 507, 509 of the single power supply 552 to connect to either the anode 504 or the cathode 506 of the electrochromic device 502, removing the need for having two power supplies or a power supply with switchable polarity. The power supply can thus be simpler and possibly more robust or of larger current or voltage drive than would be possible with the parts count or footprint of other power supply possibilities. Switches 556, 558, 560, 562 could be implemented with various solid-state devices such as transistors, including bipolar, MOSFET (metal oxide semiconductor field effect transistor), JFET Junction field effect transistor) and other FETs, triacs, etc., or relays.

Similar to the embodiment in FIG. 5A, the distributed EMS 102 in FIG. 5B provides power to the H-bridge driver 570 using AC power 132 and/or DC power from the battery for supplying the single power supply 552, the microcontroller 514, and other circuitry. The distributed EMS 102 manages battery charging and discharging. The microcontroller 514 has related duties in the embodiment shown in FIG. 5B comparable to the duties for the embodiment in FIG. 5A, including making decisions about power selection and operation of the single power supply 552 and the switches 556, 558, 560, 562 of the H bridge 501, to charge, discharge or float the electrochromic device 502, or cease operations if any of the monitored voltages or currents is anomalous.

Also similar to the embodiment in FIG. 5A, the failsafe module 554 in FIG. 5B monitors the anode 504, sense voltage 508, cathode 506 of the electrochromic device 502, e.g., for voltages and/or currents, and overrides controls from the microcontroller 514 to operate the switches 556, 558, 560, 562 of the H bridge 501 in case of failure detected by the failsafe module 554. The failsafe module 554 could have a mode selection module 524, switch control module 526 and comparators 528 related to those of the failsafe module 522 of FIG. 5A, or other circuitry readily devised to perform various functions of failsafe operation as described herein. In some embodiments, there is no processor, only analog and digital circuitry in the failsafe module 554, for example logic and sensing circuitry.

In various operating scenarios, the microcontroller 514 selects AC or DC power from the distributed EMS 102 to source the single power supply 552, and sends signals to the failsafe module 554 to close the switches 562, 556 labeled "S4" and "S1" and connect the positive rail 507 of the single power supply 552 to the cathode 506 and the negative rail 509 of the single power supply 552 to the anode 504. The failsafe module 554 does not exercise the override, and the microcontroller 514 has control of the switches of the H bridge 501. When the electrochromic device 502 reaches the desired tinting or transmissivity level, the microcontroller 514 directs the switches 556, 558, 560, 562 of the H bridge 501 to open. At another time, the microcontroller 514 directs the failsafe module 554 to close the switches 558, 560 labeled "S2" and "S3" and connect the positive rail 507 of the single power supply 552 to the anode 504 and the negative rail 509 of the single power supply 552 to the cathode 506 of the electrochromic device 502.

At a later time, the failsafe module 554 detects an anomalous voltage or current in the anode 504, sense voltage 508 or cathode 506, and overrides signals from the microcontroller 514 to open all of the switches 556, 558, 560, 562 of the H bridge 501. Alternatively, depending on design or the mode selected for the failsafe module 554, the failsafe module 554 could override signals from the microcontroller 514 to close the switches 556, 558 labeled "S1" and "S2" and electrically short the anode 504 and the cathode 506 to each other, or close the switches 560, 562 labeled "S3" and "S4" to accomplish the same. In a further embodiment, the failsafe module 554 could override signals from the microcontroller 514 to open the switches 558, 562 labeled "S2" and "S4" and disconnect the anode 504 of the electrochromic device 502 from the single power supply 552, or open the switches 556, 560 labeled "S1" and "S3" to disconnect the cathode 506 of the electrochromic device 502 from the single power supply 552. At no time, by design, should the failsafe module 554 allow the switches 556, 560 labeled "S1" and "S3" to be closed at the same time, as this would short out the positive rail 507 and negative rail 509 of the single power supply 552. Likewise, the failsafe module 554 should not allow the switches 558, 562 labeled "S2" and "S4" to be closed at the same time, as this would also short out the positive rail 507 and negative rail 509 of the single power supply 552. A possible exception to this feature is when both AC and DC power are decoupled from the single power supply 552, and it is desired to shut down and short out the single power supply 552 as well as short the anode 504 and cathode 506 to each other, for example during some sort of emergency shutdown of the system. Logic for these various scenarios, modes, overrides and desired operation and polarity of the switches in the H bridge 501 is implementation specific and readily devised in keeping with the teachings herein.

Figure 6:
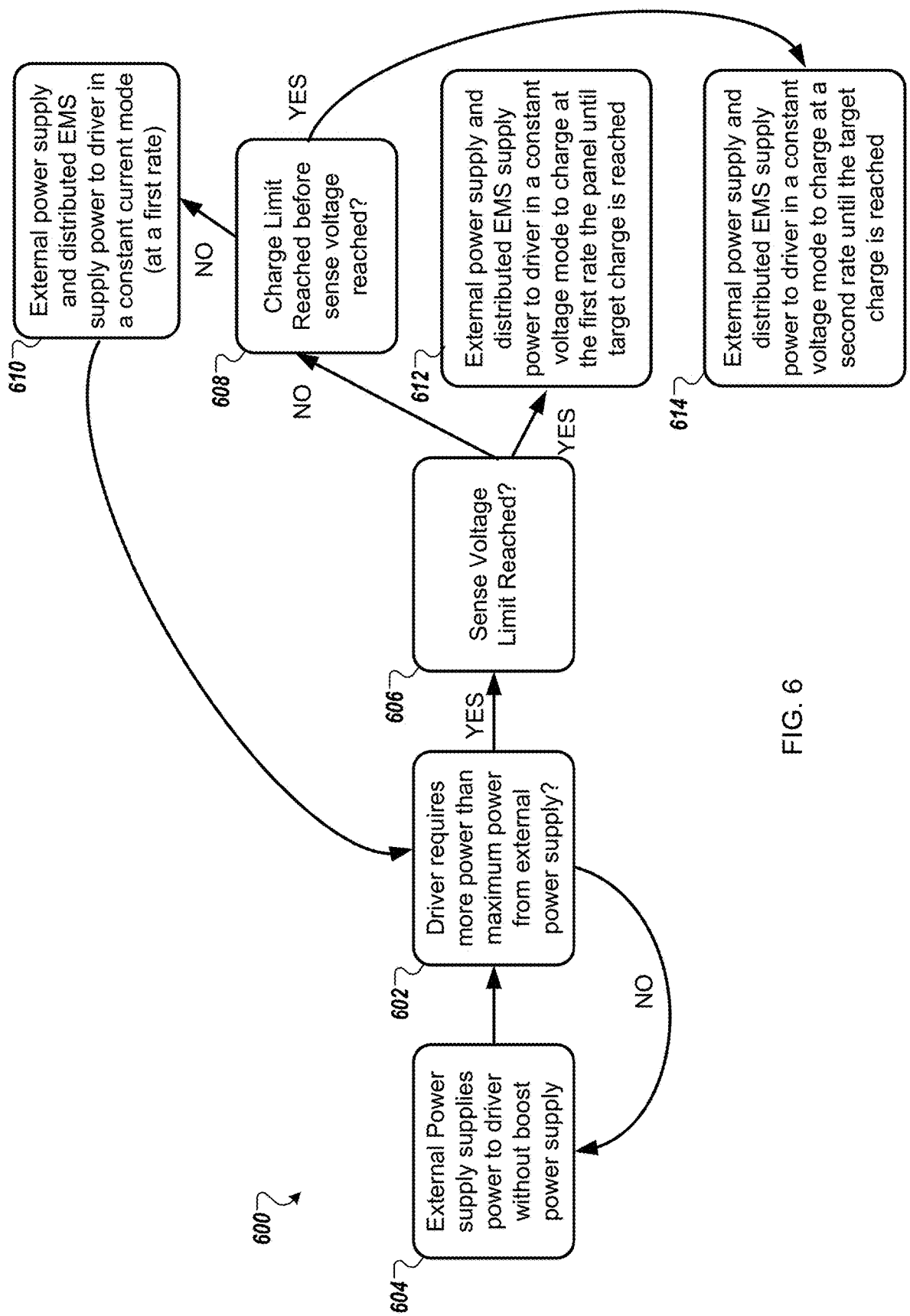
FIG. 6 is a state diagram depicting operations of an electrochromic device with an external power supply and a boost power supply according to one embodiment.

FIG. 6 is a state diagram 600 depicting operations of an electrochromic device with an external power supply and a boost power supply according to one embodiment. At state 602, the central question is if the electrochromic device requires more power than the limited amount of power that can be supplied from the external power supply. If the answer is no at state 602, and the power required by the electrochromic device is less than the limited amount of power that can be supplied from the external power supply, then the power can be supplied by the external power supply alone at state 604. That is, the external power supply supplies power to one or more of the drivers without the boost power supply. If the answer is yes at state 602, and the power required by the electrochromic device is more than the limited amount of power that can be supplied from the external power supply, then the power can be supplied by the boost power supply. In some embodiments, if the answer is yes at state 602, and the power required by the electrochromic device is more than the limited amount of power that can be supplied from the external power supply, then the power can be supplied by the external power supply and the boost power supply together. In the embodiments described herein of the boost power supply, another question is if the sense voltage has been reached at state 606. If the answer is yes at state 606, then another question is if the charge limit has been reached at state 608. If the answer is no at state 608, then the power can be supplied by the boost power supply (and the external power supply) at a first charge or discharge rate in a constant current mode at state 610 and returns to state 602. If the answer is yes at state 606, then the power can be supplied by the boost power supply (and the external power supply) at the first charge or discharge rate in a constant voltage mode at state 612. If the answer is yes at state 608, then the power can be supplied by the boost power supply (and the external power supply) at a first charge or discharge rate in a constant voltage mode at state 614. The second charge or discharge rate can be less than the first charge or discharge rate at state 610 or 612. When the charge limit is reached at state 608, the electrochromic device can be determined to be at a temperature that is higher than room temperature. The state 608 can be reported to a user, a log, a report, or the like.

The electrochromic device (or the set of electrochromic devices) with an external power supply and a boost power supply can be configured such that the external power supply supplies less than 5% of the maximum power used by the electrochromic device, or less than 10% of the maximum power used by the electrochromic device, or less than 15% of the maximum power used by the electrochromic device, or less than 20% of the maximum power used by the electrochromic device, or less than 25% of the maximum power used by the electrochromic device, or less than 30% of the maximum power used by the electrochromic device, or from 1 to 5% of the maximum power used by the electrochromic device, or from 1 to 10% of the maximum power used by the electrochromic device, or from 1 to 15% of the maximum power used by the electrochromic device, or from 1 to 20% of the maximum power used by the electrochromic device, or from 1 to 25% of the maximum power used by the electrochromic device, or from 1 to 30% of the maximum power used by the electrochromic device.

The electrochromic device (or the set of electrochromic devices) with an external power supply and a boost power supply can have a boost power supply containing a lithium iron phosphate battery. The set of electrochromic devices with an external power supply and a boost power supply can have a boost power supply containing a lithium iron phosphate battery with a capacity from 100 to 10000 mAh, or from 100 to 5000 mAh, or from 100 to 2500 mAh, or from 100 to 1500 mAh, or from 500 to 10000 mAh, or from 1000 to 10000 mAh, or from 1000 to 5000 mAh, or from 1000 to 2500 mAh, or from 1000 to 1500 mAh for each driver corresponding to one of the electrochromic devices.

In some embodiments, the electrochromic device (or the set of electrochromic devices) with an external power supply and a boost power supply with multiple lithium iron phosphate batteries with a capacity capable of fully charging and discharging the set of electrochromic devices more than 1 time, or more than 2 times, or more than 3 times, or more than 4 times, or more than 5 times, or more than 10 times, or from 1 to 10 times, or from 1 to 5 times, or from 2 to 5 times, or from 3 to 5 times.

In some embodiments, the electrochromic device (or the set of electrochromic devices) with an external power supply and a boost power supply with multiple lithium iron phosphate batteries are operated such that the batteries are in shallow discharge operation. In some embodiments, the electrochromic device (or the set of electrochromic devices) with an external power supply and a boost power supply with multiple lithium iron phosphate batteries are operated such that the batteries' charge does not drop below 60% of its full capacity, or below 70% of its full capacity, or below 80% of its full capacity or below 90% of its full capacity. In some embodiments, the electrochromic device (or the set of electrochromic devices) with an external power supply and a boost power supply with multiple lithium iron phosphate batteries are operated such that the batteries' charge does not drop below 60% of its full capacity, or below 70% of its full capacity, or below 80% of its full capacity or below 90% of its full capacity during a typical device charge or discharge cycle. In some embodiments, the electrochromic device (or the set of electrochromic devices) with an external power supply and a boost power supply with multiple lithium iron phosphate batteries are operated such that the batteries' charge does not drop below 60% of its full capacity, or below 70% of its full capacity, or below 80% of its full capacity or below 90% of its full capacity during a charge or discharge cycle that changes the device from a state of maximum optical transmission to a state of minimum optical transmission.

In some embodiments, each of the multiple lithium iron phosphate batteries can have a battery lifetime greater than 5 years, or greater than 10 years, or greater than 15 years, or greater than 20 years, or from 1 to 20 years, or from 1 to 15 years, or from 1 to 10 years, or from 5 to 20 years, or from 5 to 15 years. In some embodiments, each of the multiple lithium iron phosphate batteries can have a battery lifetime greater 1000 cycles, or greater than 2000 cycles, or greater than 3000 cycles, or greater than 5000 cycles, or greater than 10000 cycles, or greater than 20000 cycles, or from 1000 to 20000 cycles, or from 1000 to 10000 cycles.

The local battery in a local boost power supply or the set of multiple batteries in the multi-device boost power supply can have any type of rechargeable batteries. More specifically, the each of the multiple batteries can be a lithium iron phosphate battery, a NiCd battery, a Ni-metal hydride battery, a lead acid battery, a Li-ion battery, a Li-ion polymer battery, a Li-ion polymer battery with Co, a Li-ion polymer battery with Mn, a Li-ion polymer battery with a phosphate, a rechargeable alkaline battery, a Li-sulfur battery, a Na-ion battery, a thin film Li battery, a ZnBr battery, a ZnCe battery, a V redox battery, a Na-sulfur battery, a molten salt battery, a AgZn battery. Any of the batteries in the boost power supply in the previous list can have a capacity from 100 to 10000 mAh, from 100 to 5000 mAh, from 100 to 2500 mAh, from 100 to 1500 mAh, from 500 to 10000 mAh, from 1000 to 10000 mAh, from 1000 to 5000 mAh, from 1000 to 2500 mAh, from 1000 to 1500 mAh.

The boost power supply can contain any type of electrical energy storage. More specifically, the boost power supply can contain solid state batteries including a range of electrochemical batteries and capacitors, supercapacitors, or ultracapacitors, or flow batteries including batteries where the energy is stored directly in the electrolyte solution, or Flywheels including mechanical devices that harness rotational energy to deliver instantaneous electricity, or compressed air energy storage, or superconducting magnetic energy storage, or the like.

The boost power supply can have an external power supply that is located a distance away from the boost power supply that is more than 1 m, or more than 2 m or more than 5 m, or more than 10 m, or more than 15 m, or more than 20 m, or more than 30 m, or more than 40 m, or more than 50 m, or more than 100 m, or from 1 to 1000 m, or from 1 to 100 m, or from 1 to 50 m, or from 1 to 20 m, or from 10 to 1000 m, or from 10 to 100 m or from 10 to 50 m. The boost power supply can be located a distance away from the electrochromic device that is more than 1 m, or more than 2 m or more than 5 m, or more than 10 m, or more than 15 m, or more than 20 m, or more than 30 m, or more than 40 m, or more than 50 m, or more than 100 m, or from 1 to 1000 m, or from 1 to 100 m, or from 1 to 50 m, or from 1 to 20 m, or from 10 to 1000 m, or from 10 to 100 m or from 10 to 50 m. The boost power supply can have an external power supply that is located a distance away from the boost power supply that is less than 10 m, or less than 5 m, or less than 4 m, or less than 3 m, or less than 2 m, or less than 1 m, or less than 0.1 m, or less than 0.01 m, or from 0.001 to 10 m, or from 0.001 to 5 m, or from 0.001 to 1 m, or from 0.001 to 0.1 m, or from 0.1 to 10 m, or from 0.1 to 5 m, or from 0.1 to 1 m.

The electrochromic device (or the set of electrochromic devices) with an external power supply and a boost power supply can have wires connecting the external power supply to the electrochromic device with AWG gauge greater than 15, or 16, or 17, or 18, or 19, or 20, or 21, or 22, or 23, or 24, or 25, or 26, or 27, or 28, or 29, or 30, or 31, or 32, or 33, or 34, or 35, or 36, or 37, or 38, or 39, or 40, or from 15 to 40, or from 20 to 40, or from 25 to 40, or from 30 to 40, or from 35 to 40, or from or from 15 to 25, or from 15 to 30, or from 20 to 25, or from 20 to 30.

The electrochromic device (or the set of electrochromic devices) with an external power supply and a boost power supply can have an external power supply configured to supply power wirelessly to the electrochromic device. In such a system the external power supply might not have any wires connecting it to the electrochromic device. The electrochromic device (or the set of electrochromic devices) with an external power supply and a boost power supply can have an external power supply configured to supply power wirelessly to the electrochromic device using non-radiative techniques, such as near-field coupling inductive (magnetic) coupling, or near-field resonant inductive coupling, or near-field capacitive coupling, or near-field resonant capacitive coupling, or atmospheric plasma channel coupling, or magnetodynamic coupling, or using far-field radiative techniques such as microwaves or lasers to wireless transmit the power.

The electrochromic device (or the set of electrochromic devices) with an external power supply and a boost power supply can switch from a maximum optical transmissivity to a minimum optical transmissivity state in less than 30 min, or less than 25 minutes, or less than 20 minutes, or less than 15 minutes, or less than 10 minutes, or less than 5 minutes, or from 5 to 30 minutes, or from 5 to 20 minutes, or from 5 to 15 minutes, or from 5 to 10 minutes, or from 1 to 30 minutes, or from 1 to 20 minutes, or from 1 to 10 minutes, or from 1 to 5 minutes. The electrochromic device (or the set of electrochromic devices) with an external power supply and a boost power supply can switch from a first optical transmissivity to a second optical transmissivity state in less than 30 min, or less than 25 minutes, or less than 20 minutes, or less than 15 minutes, or less than 10 minutes, or less than 5 minutes, or from 5 to 30 minutes, or from 5 to 20 minutes, or from 5 to 15 minutes, or from 5 to 10 minutes, or from 1 to 30 minutes, or from 1 to 20 minutes, or from 1 to 10 minutes, or from 1 to 5 minutes.

The boost power supply can also provide power in situations when the electrochromic device (or the set of electrochromic devices) is cut off or disconnected from the external power supply. Such situations could include a power failure of the power provided to the external power supply, or a failure of the external power supply. In some cases, the electrochromic device (or the set of electrochromic devices) could be disconnected from the external power supply by a user action. For example, if the electrochromic device is part of an electrochromic window or door assembly, then the assembly may be configured to disconnect the electrochromic device from the external power supply when it is opened. In these situations, the boost power supply could provide power to the electrochromic device to switch the device from a first transmissivity state to a second transmissivity state or provide power to maintain the electrochromic device in a certain transmissivity state.

Figure 7:
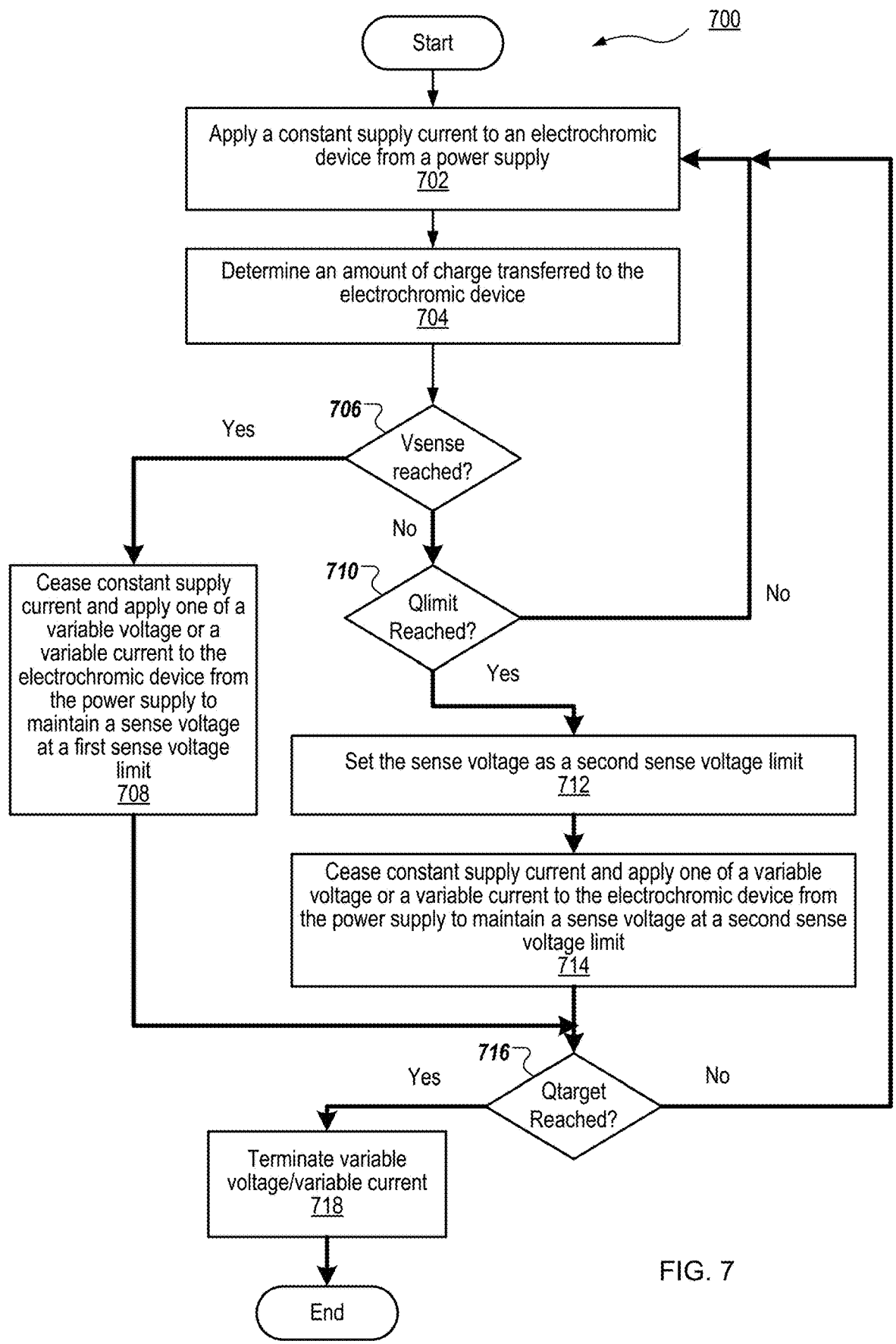
FIG. 7 is a flow diagram of a method of supplying power to an electrochromic device with overcharge protection according to one embodiment.

FIG. 7 is a flow diagram of a method 700 of supplying power to an electrochromic device with overcharge protection according to one embodiment. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by any one of the set of drivers 104 of FIG. 1 or FIG. 3. In another embodiment, the method 700 is performed by the driver 200 of FIG. 2, the dual-rail driver 500 of FIG. 5, or the H bridge driver 570 of FIG. 5B. Alternatively, the method 700 is performed by the individual supply control module 206 of FIG. 2A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 7, the method 700 begins by the processing logic applying a constant supply current to an electrochromic device from a power supply (block 702). The processing logic determines an amount of charge transferred to the electrochromic device as a function of time and current supplied to the electrochromic device (block 704). At block 706, the processing logic determines whether a sense voltage of the electrochromic device reaches a first sense voltage limit. Responsive to the sense voltage reaching the first sense voltage limit, the processing logic ceases the constant supply current and applies one of a variable voltage or a variable current to the electrochromic device from the power supply to maintain a sense voltage at a first sense voltage (block 708) and proceeds to block 716. When the sense voltage does not reach the first sense voltage limit at block 706, the processing logic determines whether the amount of charge reaches an overcharge limit (Qlimit) before the sense voltage reaches the first sense voltage limit (block 710). Responsive to the amount of charge reaching the overcharge limit before the sense voltage reaches the first sense voltage limit at block 710, the processing logic sets the sense voltage as a second sense voltage limit that is lower than the first sense voltage limit (block 712). The processing logic ceases the constant supply current from the power supply from being applied to the electrochromic device and applies one of a variable voltage or a variable current to the electrochromic device from the power supply to maintain a sense voltage at the second sense voltage limit (block 714) and proceeds to block 716. When the charge limit is not reached at block 710, the processing logic returns to block 702. Alternatively, the processing logic can return to block 704 or block 706.

At block 716, the processing logic determines whether the amount of charge transferred to the electrochromic device reaches a target amount of charge (Qtarget). Responsive to the amount of charge reaching the target amount of charge at block 716, the processing logic terminates the one of the variable voltage or the variable current from being applied to the electrochromic device from the power supply (block 718), and the method 700 ends. Responsive to the amount of charge not reaching the target amount of charge at block 716, the processing logic returns to block 702. Alternatively, the processing logic can return to block 704 or block 706.

In one embodiment, the first sense voltage limit at block 708 is predefined and stored in memory and corresponds to a sense voltage limit of the electrochromic device at room temperature. The second sense voltage limit at block 714 corresponds to a temperature higher than room temperature. As such, the method 700 provides an overcharge protection when the electrochromic device is in a higher temperature environment.

In a further embodiment, the processing logic reports an overcharge prevention event that indicates that the amount of charge reached the overcharge limit before the sense voltage reaches the first sense voltage limit at block 710. The overcharge prevention event can include additional information, such as the second sense voltage limit set at block 712. In a further embodiment, the processing logic determines a temperature measurement of the electrochromic device using the second sense voltage limit and reports the temperature measurement, such as to a user, a log, a report, or the like.

In a further embodiment, the processing logic provides external power from the external power supply to recharge one or more batteries of the boost power supply, during time periods when the power required by the electrochromic device is less than the limited amount of power. The external power provided can be equal to or less than the limited amount of power. In another embodiment, the processing logic provides a decreased amount of power from the external power supply to recharge one or more batteries of the boost power supply, during time periods when the power required by the electrochromic device is less than the limited amount of power and when the one or more batteries is more than 90% charged. The decreased amount of power provided can be less than the limited amount of power.

In another embodiment, the processing logic at block 702 applies the constant supply current from an external power supply, a boost power supply, or both. The processing logic at block 714 (or block 708), applies the one of the variable voltage or the variable current from the power supply from the external power supply, the boost power supply, or both. In another embodiment, the processing logic at block 702 applies an amount of power that is less than or equal to a limited amount of power. The processing logic at block 714 (or block 708) can determine an amount of power required by the electrochromic device and supply additional power to the electrochromic device from the boost power supply responsive to the amount of power required by the electrochromic device being larger than the limited amount of power.

In another embodiment of a method of supplying power to an electrochromic device with overcharge protection, the processing logic receives a message from an input device to transition an electrochromic device from a first optical transmissivity state to a second optical transmissivity state. The processing logic charges the electrochromic device from a power supply. The power supply can include AC power from an external power source and/or DC power from a battery. The processing logic determines that an amount of charge transferred to the electrochromic device reaches a charge limit before a sense voltage reaches a first sense voltage limit. Responsive to the amount of charge reaching the charge limit, the processing logic changes the first sense voltage limit to a second sense voltage limit that is lower than the first sense voltage limit and maintains the sense voltage at or below the second sense voltage limit while charging or discharging the electrochromic device from the power supply. In some cases of charging the electrochromic device, the processing logic charges the electrochromic device at a first rate before the amount of charge reaches the charge limit and charges the electrochromic device at a second rate after the amount of charge limit, the second rate being slower than the first rate.

In other embodiments, the charge limit can be programmed for a particular mode, such as a normal power mode. A second charge limit can be programmed and used for another node, such as a power mode. These charge limits can be programmed independently and as different values.

In a further embodiment, the processing logic can report an event that indicates that the amount of charge transferred to the electrochromic device reaches the charge limit before the sense voltage reaches a first sense voltage limit. The processing logic can report the event by storing a log of the vent, sending a message with the event, or the like.

In a further embodiment, the processing logic determines that the amount of charge transferred to the electrochromic device reaches a target amount of charge. Responsive to the amount of charge reaching the target amount of charge, the processing logic ceases charging the electrochromic device.

Figure 8:
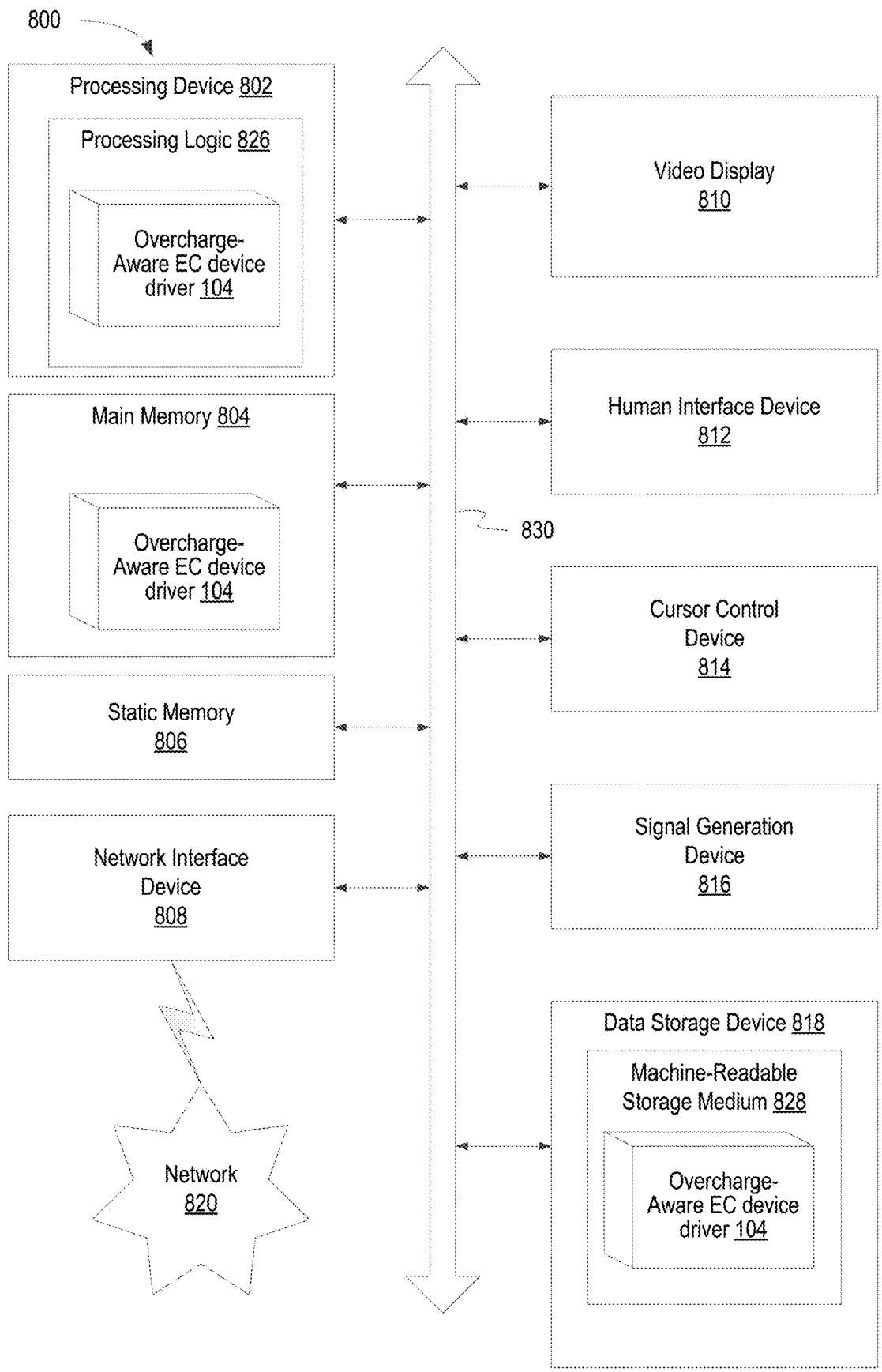
FIG. 8 illustrates a diagrammatic representation of a machine in the example form of a computer system including a set of instructions executable by a computer system to control charging and discharging an electrochromic device with overcharge protection according to any one or more of the methodologies discussed herein.

FIG. 8 illustrates a diagrammatic representation of a machine in the example form of a computer system including a set of instructions executable by a computer system 800 to control charging and discharging an electrochromic device with overcharge protection according to any one or more of the methodologies discussed herein. In one embodiment, the computer system may include instructions to enable execution of the processes and corresponding components shown and described in connection with FIGS. 1-7.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 800 includes a processing device 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. In various implementations of the present disclosure, the processing device 802 is configured to execute instructions for the overcharge-aware electrochromic device driver 104 for performing the operations and processes described herein.

The computer system 800 may further include a network interface device 808. The computer system 800 also may include a video display unit 810 (e.g., a light emitting diode (LED) display, a liquid crystal display (LCD) or a cathode ray tube (CRT)), a human interface device 812 (e.g., keyboard, gesture-control input device, touchpad, touchscreen, a voice-controlled speaker, an alphanumeric input device, or the like), a cursor control device 814 (e.g., a mouse, touchpad, touchscreen, or the like), and a signal generation device 816 (e.g., a speaker).

The data storage device 818 may include a computer-readable storage medium 828 (or machine-readable medium) on which is stored one or more sets of instructions of the overcharge-aware electrochromic device driver 104 embodying any one or more of the methodologies or functions described herein. The instructions may also reside, completely or at least partially, within the main memory 804 and/or within processing logic 826 of the processing device 802 during execution thereof by the computer system 800, the main memory 804 and the processing device 802 also constituting computer-readable media.

The instructions may further be transmitted or received over a network 820 via the network interface device 808. While the computer-readable storage medium 828 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing", "applying", "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   applying a constant supply current to an electrochromic device from a power supply;

determining an amount of charge transferred to the electrochromic device as a function of time and current supplied to the electrochromic device;

determining whether the amount of charge reaches an overcharge limit before a sense voltage reaches a first sense voltage limit; and responsive to the amount of charge reaching the overcharge limit before the sense voltage reaches the first sense voltage limit, setting the sense voltage as a second sense voltage limit that is lower than the first sense voltage limit;

ceasing the applying the constant supply current from the power supply; and applying one of a variable voltage or a variable current to the electrochromic device from the power supply to maintain the sense voltage at the second sense voltage limit.

2. The method of claim 1, further comprising:

determining whether the amount of charge transferred to the electrochromic device reaches a target amount of charge; and responsive to the amount of charge reaching the target amount of charge, terminating the applying the one of the variable voltage or the variable current to the electrochromic device from the power supply.

3. The method of claim 1, wherein the first sense voltage limit is predefined and stored in memory and corresponds to a sense voltage limit of the electrochromic device at room temperature, and wherein the second sense voltage limit corresponds to a temperature higher than room temperature.

4. The method of claim 1, further comprising reporting an overcharge prevention event that indicates that the amount of charge reached the overcharge limit before the sense voltage reaches the first sense voltage limit and the second sense voltage limit.

5. The method of claim 4, further comprising determining a temperature measurement of the electrochromic device using the second sense voltage limit; and reporting the temperature measurement.

6. The method of claim 5, further comprising:

providing external power from an external power supply to recharge one or more batteries of a boost power supply, during time periods when the power required by the electrochromic device is less than a limited amount of power from the external power supply, wherein the external power provided is equal to or less than the limited amount of power.

7. The method of claim 6, further comprising:

providing a decreased amount of power from the external power supply to recharge one or more batteries of the boost power supply, during time periods when the power required by the electrochromic device is less than the limited amount of power and when the one or more batteries is more than 90% charged, wherein the decreased amount of power provided is less than the limited amount of power.

8. The method of claim 1, wherein the applying the constant supply current from the power supply comprises applying the constant supply current from at least one of an external power supply or a boost power supply, and wherein the applying the one of the variable voltage or the variable current from the power supply comprises applying the one of the variable voltage or the variable current from at least one of the external power supply or the boost power supply.

9. The method of claim 8, wherein the applying the constant supply current from the external power supply comprises applying an amount of power that is less than or equal to a limited amount of power from the external power supply, wherein the method further comprises determining an amount of power required by the electrochromic device and supplying additional power to the electrochromic device from the boost power supply responsive to the amount of power required by the electrochromic device being larger than the limited amount of power.

10. A overcharge-aware electrochromic device driver comprising:

a power supply control module coupled to a power supply comprising an external power supply and a boost power supply, wherein the power supply control module is to:

apply a constant supply current to an electrochromic device from the power supply;

determine an amount of charge transferred to the electrochromic device as a function of time and current supplied to the electrochromic device;

determine whether the amount of charge reaches an overcharge limit before a sense voltage reaches a first sense voltage limit; and responsive to the amount of charge reaching the overcharge limit before the sense voltage reaches the first sense voltage limit, set the sense voltage as a second sense voltage limit that is lower than the first sense voltage limit;

cease the constant supply current from being applied to the electrochromic device from the power supply; and apply one of a variable voltage or a variable current to the electrochromic device from the power supply to maintain the sense voltage at the second sense voltage limit.

11. The overcharge-aware electrochromic device driver of claim 10, wherein the power supply control module is to:

determine whether the amount of charge transferred to the electrochromic device reaches a target amount of charge; and terminate the one of the variable voltage or the variable current from being applied to the electrochromic device from the power supply responsive to the amount of charge reaching the target amount of charge.

12. The overcharge-aware electrochromic device driver of claim 10, wherein the power supply control module is to:

store in memory the first sense voltage limit, wherein the first sense voltage limit is a predefined value that corresponds to a sense voltage limit of the electrochromic device at room temperature; and store in the memory the second sense voltage limit responsive to the amount of charge reaching the overcharge limit before the sense voltage reaches the first sense voltage limit, and wherein the second sense voltage limit corresponds to a temperature higher than room temperature.

13. The overcharge-aware electrochromic device driver of claim 10, further comprising:

an ammeter and an integrator configured to measure the amount of charge transferred to the electrochromic device; and a voltmeter configured to measure the sense voltage of the electrochromic device.

14. The overcharge-aware electrochromic device driver of claim 10, wherein the electrochromic device is an electrochromic window with a switching time of less than 10 minutes from a maximum optical transmissivity state to a minimum optical transmissivity state.

15. The overcharge-aware electrochromic device driver of claim 10, further comprising:
- a failsafe module coupled to the power supply control module; and
- a plurality of switches arranged as an H bridge to couple and decouple a first power supply rail of the power supply and a second power supply rail of the power supply to and from the electrochromic device, wherein the power supply control module is coupled to the H bridge and configured to control the plurality of switches of the H bridge to charge and discharge the electrochromic device from the first power supply rail and the second power supply rail using control signals, wherein the failsafe module is configured to override one or more of the control signals responsive to detecting an anomaly of the electrochromic device.

16. The overcharge-aware electrochromic device driver of claim 15, wherein the power supply control module is further to:
- direct the power supply and the H bridge to drive the electrochromic device with a first positive voltage to charge the electrochromic device until at least one of the sense voltage reaches the first sense voltage limit or the amount of charge transferred to the electrochromic device reaches the overcharge limit;
- direct the power supply and the H bridge to drive the electrochromic device with a second variable positive voltage or the variable current to maintain the sense voltage at the second sense voltage limit or the first sense voltage limit; and
- directing the power supply and the H bridge to stop driving the electrochromic device when the amount of charge reaches a target amount of charge, wherein the target amount of charge corresponds to a specified level of transmissivity of the electrochromic device.

17. The overcharge-aware electrochromic device driver of claim 15, wherein the power supply control module is further to:
- direct the power supply and the H bridge to drive the electrochromic device with a first negative voltage to discharge the electrochromic device until at least one of the sense voltage reaches the first sense voltage limit or the amount of charge transferred to the electrochromic device reaches the overcharge limit;
- direct the power supply and the H bridge to drive the electrochromic device with a second variable negative voltage or the variable current to maintain the sense voltage at the second sense voltage limit or the first sense voltage limit; and
- directing the power supply and the H bridge to stop driving the electrochromic device when the amount of charge reaches a target amount of charge, wherein the target amount of charge corresponds to a level of transmissivity of the electrochromic device.

18. The overcharge-aware electrochromic device driver of claim 15, wherein the failsafe module comprises a failsafe circuit having a mode select configurable to disconnect the electrochromic device from the power supply in a first failsafe mode and to connect a first terminal of the electrochromic device to a second terminal of the electrochromic device in a second failsafe mode.

19. A system comprising:
- an electrochromic device;
- a driver coupled to the electrochromic device; and
- an input device operatively coupled to the driver, wherein the driver is to:
  - receive a message from the input device to transition the electrochromic device from a first optical transmissivity state to a second optical transmissivity state;
  - charge the electrochromic device from a power supply;
  - determine that an amount of charge transferred to the electrochromic device reaches a charge limit before a sense voltage reaches a first sense voltage limit;
  - responsive to the amount of charge reaching the charge limit,
    - change the first sense voltage limit to a second sense voltage limit that is lower than the first sense voltage limit; and
    - maintain the sense voltage at or below the second sense voltage limit while charging or discharging the electrochromic device from the power supply.

20. The system of claim 19, wherein the driver comprises a memory to store the first sense voltage limit, wherein the first sense voltage limit corresponds to a sense voltage limit of the electrochromic device at a first temperature, wherein the second sense voltage limit corresponds to a second temperature that is higher than the first temperature, wherein the driver is further to:
- report an event that indicates that the amount of charge transferred to the electrochromic device reaches the charge limit before the sense voltage reaches a first sense voltage limit;
- determine that the amount of charge transferred to the electrochromic device reaches a target amount of charge; and
- responsive to the amount of charge reaching the target amount of charge, cease charging the electrochromic device.

* * * * *